(12) United States Patent
Aita

(10) Patent No.: US 12,337,734 B2
(45) Date of Patent: Jun. 24, 2025

(54) VEHICLE SEAT

(71) Applicant: TS TECH CO., LTD., Asaka (JP)

(72) Inventor: Shinya Aita, Shizuoka (JP)

(73) Assignee: TS TECH CO., LTD., Asaka (JP)

( * ) Notice: Subject to any disclaimer, the term of this patent is extended or adjusted under 35 U.S.C. 154(b) by 227 days.

(21) Appl. No.: 18/034,804

(22) PCT Filed: Nov. 1, 2021

(86) PCT No.: PCT/JP2021/040260
§ 371 (c)(1),
(2) Date: May 1, 2023

(87) PCT Pub. No.: WO2022/092314
PCT Pub. Date: May 5, 2022

(65) Prior Publication Data
US 2023/0406171 A1    Dec. 21, 2023

Related U.S. Application Data

(60) Provisional application No. 63/198,889, filed on Nov. 20, 2020, provisional application No. 63/198,653, filed on Nov. 2, 2020.

(30) Foreign Application Priority Data

Mar. 22, 2021  (JP) .................. 2021-047186

(51) Int. Cl.
*B60N 2/36*       (2006.01)
*B60N 2/30*       (2006.01)
*B60N 2/90*       (2018.01)

(52) U.S. Cl.
CPC ............ *B60N 2/36* (2013.01); *B60N 2/3013* (2013.01); *B60N 2/3065* (2013.01); *B60N 2/309* (2013.01);
(Continued)

(58) Field of Classification Search
None
See application file for complete search history.

(56) References Cited

U.S. PATENT DOCUMENTS 3,982,787 A     9/1976  Moll
10,980,347 B1 *  4/2021  Levin ...................... A47C 4/02
(Continued)

FOREIGN PATENT DOCUMENTS

DE    102004019894 A1    11/2005
JP       2005306357 A    11/2005
(Continued)

OTHER PUBLICATIONS

PCT International Search Report (w/ English Translation) and Written Opinion for corresponding PCT Application No. PCT/JP2021/040260, mailed on Feb. 1, 2022, 10 pages.

*Primary Examiner* — David E Allred
(74) *Attorney, Agent, or Firm* — Dority & Manning, P.A.

(57) ABSTRACT

A vehicle seat includes a seat cushion and a seatback and capable of assuming a use state in which a user can be seated thereon and a stowed state in which the seatback has pivoted forward from the use state to overlap with the seat cushion. The vehicle seat includes an article placement part which, in the stowed state, protrudes more forward than the seatback and is provided with a support surface that faces upward. The article placement part is preferably an ottoman supported by the seat cushion. The ottoman is preferably pivotable relative to the seat cushion. Also, in the stowed state, the ottoman is preferably pivotable relative to the seat cushion.

16 Claims, 37 Drawing Sheets

(52) U.S. Cl.
CPC ........... *B60N 2/3093* (2013.01); *B60N 2/995* (2018.02); *B60N 2002/363* (2013.01)

(56) References Cited

U.S. PATENT DOCUMENTS

| | | |
|---|---|---|
| 11,234,526 B1 * | 2/2022 | Levin .................... A47C 7/541 |
| 2005/0236882 A1 | 10/2005 | Kim |
| 2012/0025019 A1 * | 2/2012 | France .................. B64D 11/06 |
| | | 244/118.6 |
| 2016/0355108 A1 * | 12/2016 | Kimata ................ B60N 2/3013 |
| 2017/0341588 A1 * | 11/2017 | Southey .............. B60N 2/3011 |
| 2018/0105070 A1 * | 4/2018 | Dry .................... B60N 2/02246 |
| 2021/0331608 A1 * | 10/2021 | Tanaka ................ B60N 2/3075 |
| 2022/0041087 A1 * | 2/2022 | Yu .......................... B60N 2/68 |
| 2024/0166104 A1 * | 5/2024 | Taguchi ................... B60N 2/64 |

FOREIGN PATENT DOCUMENTS

| | | |
|---|---|---|
| JP | 3173395 U | 2/2012 |
| JP | 2013112002 A | 6/2013 |
| JP | 2017177865 A | 10/2017 |
| JP | 2019001242 A | 1/2019 |

\* cited by examiner

VEHICLE SEAT

CROSS REFERENCE TO RELATED APPLICATIONS

This application is the U.S. National Stage entry of International Application No. PCT/JP2021/040260, filed on Nov. 1, 2021, which, in turn, claims priority to Japanese Patent Application No. 2021-047186, filed on Mar. 22, 2021; U.S. Provisional Patent Application No. 63/198,889, filed on Nov. 20, 2020; and U.S. Provisional Patent Application No. 63/198,653, filed on Nov. 2, 2020; all of which are hereby incorporated herein by reference in their entireties for all purposes.

TECHNICAL FIELD

The present invention relates to a vehicle seat.

BACKGROUND ART

Patent Document 1 discloses a seat which can assume a stowed state in which the seat cushion is lowered and the seatback is disposed to overlap on the seat cushion.

In the stowed state of the seat, the rear surface of the seatback is disposed substantially horizontally and forms a support surface for supporting baggage.

PRIOR ART DOCUMENT(S)

Patent Document(s)

Patent Document 1: JP2013-112002A

SUMMARY OF THE INVENTION

Task to be Accomplished by the Invention

Since the size of the support surface is determined by the size of the seatback, there is a problem that it is difficult to expand the support surface. Also, depending on the front-rear position of the seat, a space may be formed in front of the support surface in the stowed state of the seat.

In view of the foregoing background, an object of the present invention is to expand, in a vehicle seat, an area where baggage can be placed.

Means to Accomplish the Task

To achieve the above object, one aspect of the present invention is a vehicle seat (1) comprising a seat cushion (4) and a seatback (3) and capable of assuming a use state in which a user can be seated thereon and a stowed state in which the seatback has pivoted forward from the use state to overlap with the seat cushion, wherein the vehicle seat comprises an article placement part (40) which, in the stowed state, protrudes more forward than the seatback and is provided with a support surface (40C) that faces upward.

According to this aspect, the area where baggage can be placed can be expanded by the article placement part.

In the above aspect, preferably, the article placement part is an ottoman (40) supported by the seat cushion.

According to this aspect, the article placement part can be used as an ottoman in the use state of the seat.

In the above aspect, preferably, the ottoman is pivotable relative to the seat cushion.

According to this aspect, the ottoman can pivot to an angle suitable for supporting the legs of the user and to an angle suitable for supporting baggage.

In the above aspect, preferably, in the stowed state, the ottoman is pivotable relative to the seat cushion.

According to this aspect, the angle of the ottoman can be changed in accordance with the shape of the baggage after the seat is brought into the stowed state.

In the above aspect, preferably, the ottoman can pivot to a horizontal position which extends forward from a front end of the seat cushion, an upward facing surface of the ottoman in the horizontal position forms the support surface, and when the ottoman is in the horizontal position, the support surface is disposed at a same height as a front end of an upper surface of the seat cushion.

According to this aspect, in the stowed state, the support surface can be placed close to the rear surface of the seatback.

In the above aspect, preferably, in the stowed state, the seatback extends more forward than the seat cushion.

According to this aspect, in the stowed state, the seatback can cover the upper surface of the seat cushion, whereby the upper surface of the seat cushion can be protected. Also, the rear surface of the seatback can be expanded.

In the above aspect, preferably, in the stowed state, a front end of the ottoman contacts a rear surface of another seat disposed in front thereof.

According to this aspect, since no space is formed in front of the seat in the stowed state, it is possible to prevent baggage from falling to in front of the seat. In the above aspect, preferably, the vehicle seat further comprises a flexible protective cover (71) having a base end (71A) joined to a rear surface of the seatback and a free end (71B), wherein when the vehicle seat is in the stowed state, the protective cover is folded back forward and covers the support surface of the ottoman.

According to this aspect, the support surface of the ottoman can be protected by the protective cover.

In the above aspect, preferably, two said vehicle seats are arranged side by side on left and right, and a gap (84) is formed between the left and right ottomans.

According to this aspect, the baggage can be inserted in the gap between the left and right ottomans so that the baggage can be fixed.

In the above aspect, preferably, the left and right seat cushions contact each other in a left-right direction, and the left and right seatbacks contact each other in the left-right direction.

According to this aspect, the area where baggage can be placed can be expanded.

Effect of the Invention

One aspect of the present invention is a vehicle seat (1) comprising a seat cushion (4) and a seatback (3) and capable of assuming a use state in which a user can be seated thereon and a stowed state in which the seatback has pivoted forward from the use state to overlap with the seat cushion, wherein the vehicle seat comprises an article placement part (40) which, in the stowed state, protrudes more forward than the seatback and is provided with a support surface (40C) that faces upward. According to this aspect, the area where baggage can be placed can be expanded by the article placement part.

In the above aspect, preferably, the article placement part is an ottoman (40) supported by the seat cushion. According to this aspect, the article placement part can be used as an ottoman in the use state of the seat.

In the above aspect, preferably, the ottoman is pivotable relative to the seat cushion. According to this aspect, the ottoman can pivot to an angle suitable for supporting the legs of the user and to an angle suitable for supporting baggage.

In the above aspect, preferably, in the stowed state, the ottoman is pivotable relative to the seat cushion. According to this aspect, the angle of the ottoman can be changed in accordance with the shape of the baggage after the seat is brought into the stowed state.

In the above aspect, preferably, the ottoman can pivot to a horizontal position which extends forward from a front end of the seat cushion, an upward facing surface of the ottoman in the horizontal position forms the support surface, and when the ottoman is in the horizontal position, the support surface is disposed at a same height as a front end of an upper surface of the seat cushion. According to this aspect, in the stowed state, the support surface can be placed close to the rear surface of the seatback.

In the above aspect, preferably, in the stowed state, the seatback extends more forward than the seat cushion. According to this aspect, in the stowed state, the seatback can cover the upper surface of the seat cushion, whereby the upper surface of the seat cushion can be protected. Also, the rear surface of the seatback can be expanded.

In the above aspect, preferably, in the stowed state, a front end of the ottoman contacts a rear surface of another seat disposed in front thereof. According to this aspect, since no space is formed in front of the seat in the stowed state, it is possible to prevent baggage from falling to in front of the seat.

In the above aspect, preferably, the vehicle seat further comprises a flexible protective cover (71) having a base end (71A) joined to a rear surface of the seatback and a free end (71B), wherein when the vehicle seat is in the stowed state, the protective cover is folded back forward and covers the support surface of the ottoman. According to this aspect, the support surface of the ottoman can be protected by the protective cover.

In the above aspect, preferably, two said vehicle seats are arranged side by side on left and right, and a gap (84) is formed between the left and right ottomans. According to this aspect, the baggage can be inserted in the gap between the left and right ottomans so that the baggage can be fixed.

In the above aspect, preferably, the left and right seat cushions contact each other in a left-right direction, and the left and right seatbacks contact each other in the left-right direction. According to this aspect, the area where baggage can be placed can be expanded.

MODE(S) FOR CARRYING OUT THE INVENTION

In the following, an embodiment in which a vehicle seat according to the present invention is applied to a rear seat (including the second row and the third row) of an automobile will be described with reference to the drawings. As will be described later, the state of the vehicle seat changes between a use state (seating state) and a stowed state. the shape and direction of each structure of the vehicle seat will be described with respect to the use form unless otherwise mentioned. Also, when it is described that some members are joined, the mode of joining includes welding and fastening unless otherwise mentioned.

Figure 1:
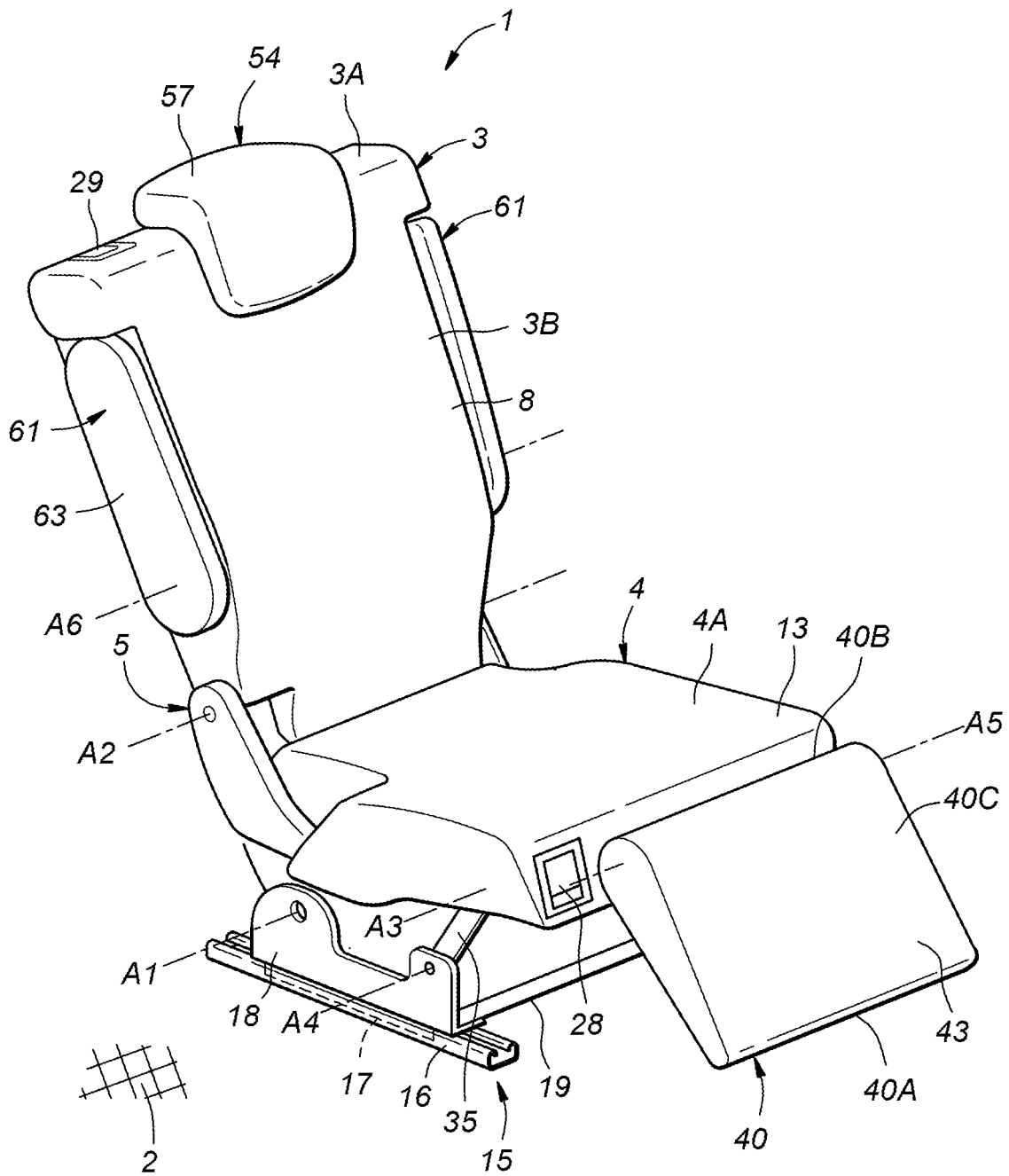
FIG. 1 is a perspective view of a seat according to an embodiment.

As shown in FIG. 1, the seat 1 includes a seatback 3 provided to be pivotable relative to the floor 2 and a seat cushion 4 provided to be pivotably relative to the seatback 3. The seat 1 can assume a use state in which the user can be seated thereon and a stowed state. In the stowed state, the seatback 3 has pivoted forward from the use state to be disposed substantially horizontally, and the seat cushion 4 has moved forward and downward and overlaps with the seatback 3. The seat 1 is a so-called dive-down seat.

Figure 2:
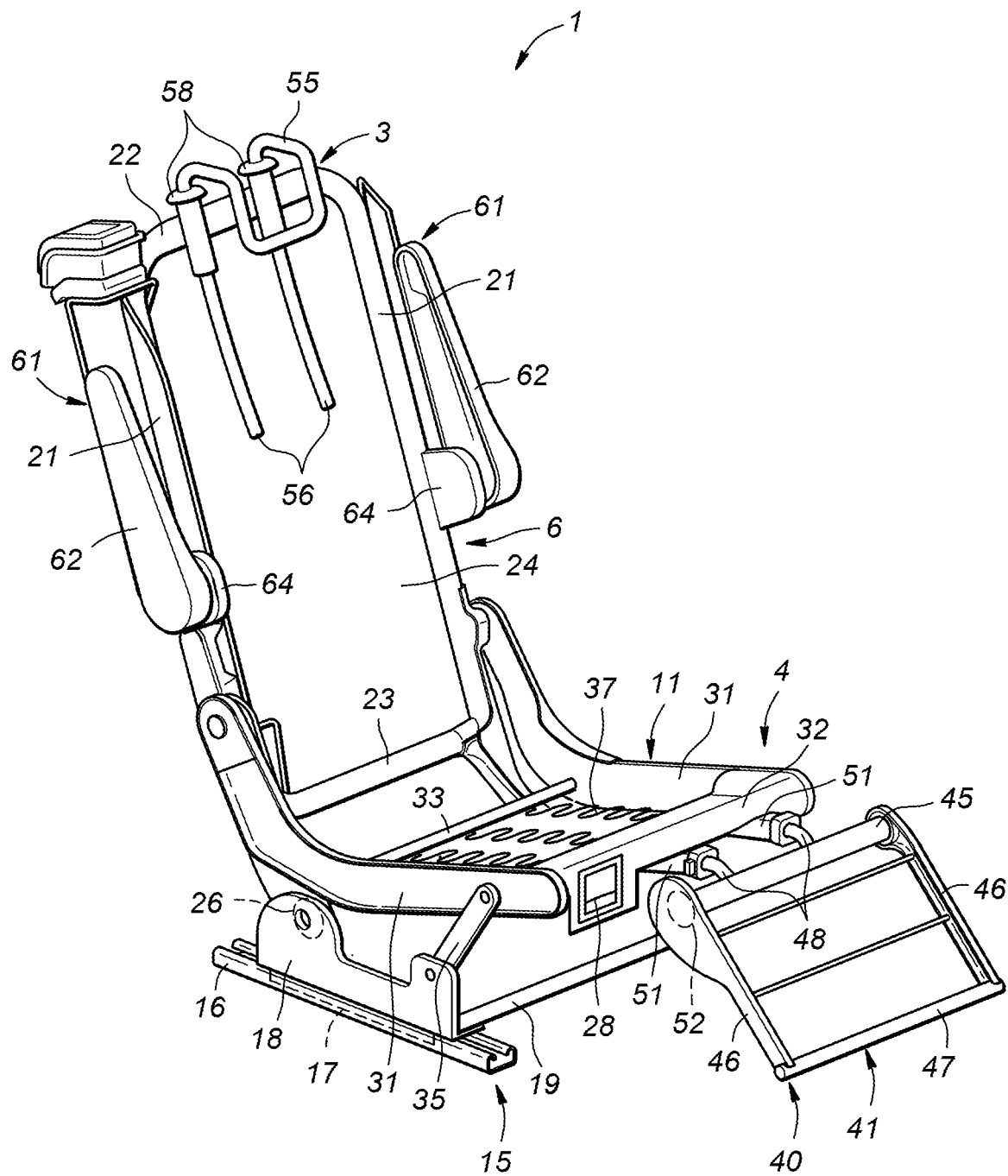
FIG. 2 is a perspective view of a frame of the seat according to the embodiment.

As shown in FIGS. 1 and 2, the seatback 3 includes a seatback frame 6 forming a skeleton, a pad (not shown in the drawings) supported on the seatback frame 6, and a skin member 8 covering the pad. The seat cushion 4 includes a seat cushion frame 11 forming a skeleton, a pad (not shown in the drawings) supported on the seat cushion frame 11, and a skin member 13 covering the pad.

The seatback 3 is supported on the floor 2 via a slide device 15. The slide device 15 includes left and right lower rails 16 extending in the fore and aft direction, and left and right upper rails 17 respectively supported on the left and right lower rails 16 to be slidingly movable in the fore and aft direction. A rail lock device (not shown in the drawings) is provided between the left/right lower rail 16 and the corresponding left/right upper rail 17. With the rail lock device, the position of the upper rails 17 relative to the lower rails 16 is selectively fixed.

A base side member 18 is joined to each of the left and right upper rails 17. Each of the left and right base side members 18 extends upward from the corresponding upper rail 17 and also extends in the fore and aft direction. The left and right base side members 18 are joined to each other by multiple base cross members 19 which extend laterally.

The seatback frame 6 includes left and right back side members 21 which extend vertically, an upper member 22 which extends laterally and is joined to upper ends of the left and right back side members 21, a lower member 23 which extends laterally below the upper member 22 and is joined to intermediate portions of the left and right back side members 21, and a plate-shaped pan frame 24 which is joined to rear portions of the left and right back side members 21, the upper member 22, and the lower member 23 and has surfaces facing forward and rearward. The lower ends of the left and right back side members 21 are pivotally supported by the laterally corresponding base side members 18 via respective lock devices 26. The lower end portions of the left and right back side members 21 are supported by the base side members 18 to be pivotable about a first axis A1 which extends laterally. An upper end portion of the seatback 3 is referred to as a shoulder portion 3A, a forward-facing surface of the same is referred to as a front surface 3B, and a rearward-facing surface of the same is referred to as a rear surface 3C.

Each lock device 26 selectively restricts pivoting of the back side member 21 relative to the base side member 18. The lock device 26 may be embodied by a known lock device (reclining device). For example, the lock device 26 preferably includes a first part joined to the base side member 18, a second part joined to the back side member 21 and rotatably supported on the base side member 18, a locking claw provided on the second part to be movable between a joining position where the locking claw is joined to the first part and a release position where the locking claw is separated from the first part, a spring for urging the locking claw toward the joining position, an operation shaft which is disposed coaxially with a rotation axis of the second member relative to the first member and is rotatable relative to the second member, and a cam which is joined to the operation shaft and, when rotated, causes the locking claw to move to the release position against the urging force of the spring. When no operating force is applied to the operation shaft from outside, the operation shaft returns to the initial position due to the urging force of the spring. When each operation shaft is rotated relative to the back side member 21, the seatback 3 becomes pivotable relative to the base side members 18 and the floor 2. Preferably, the end portion of each operation shaft is provided with a lever extending in the radial direction. The levers are connected, via control cables, to operation levers 28, 29 for receiving operation of the user. In the present embodiment, the operation levers 28, 29 are provided on an upper end portion of the seatback 3 and a front end portion of the seat cushion 4.

The seat cushion 4 is supported, at the rear end portion thereof, by an intermediate portion of the seatback 3 in the up-down direction. The seat cushion frame 11 includes left and right cushion side members 31 which extend in the fore and aft direction, a front member 32 which extends laterally and is joined to the left and right cushion side members 31, and a rear member 33 which extends laterally behind the front member 32 and is joined to the left and right cushion side members 31. The rear end portions of the left and right cushion side members 31 extend rearward beyond the rear member 33 and are curbed upward. The rear end portions of the left and right cushion side members 31 are supported by the corresponding left and right back side members 21 to be pivotable about a second axis A2 which extends laterally.

the front portions of the left and right cushion side members 31 are connected to the front portions of the base side members 18 via respective links 35. The left and right links 35 are connected to the corresponding left and right cushion side members 31 to be pivotable about a third axis A3 which extends laterally. Also, the left and right links 35 are connected to the corresponding left and right base side members 18 to be pivotable about a fourth axis A4 which extends laterally. The base side member 18, the back side member 21, the cushion side member 31, and the link 35 on the corresponding lateral side form a 4-bar link.

The front member 32 and the rear member 33 are connected to each other by a pressure receiving member 37. The pressure receiving member 37 is formed of multiple S-springs. In another embodiment, the pressure receiving member 37 may be formed of a plate member or metal wires.

An ottoman 40 is supported at the front end of the seat cushion 4. The ottoman 40 includes an ottoman frame 41, a pad (not shown in the drawings) supported on the ottoman frame 41, and a skin member 43 covering the pad. The ottoman frame 41 includes a first ottoman cross member 45 which extends laterally, left and right ottoman side members 46 which are pivotably supported by left and right end portions of the first ottoman cross member 45 and extend in the radial direction of the first ottoman cross member 45, and a second ottoman cross member 47 which extends laterally and is joined to tip end portions of the left and right ottoman side members 46.

An intermediate portion of the first ottoman cross member 45 in the left-right direction is provided with left and right ottoman pillars 48 which extend rearward from the first ottoman cross member 45. The front member 32 is provided with ottoman pillar receiving parts 51 which receive the left and right ottoman pillars 48. Thereby, the ottoman 40 is supported by the front member 32 via the ottoman pillar receiving parts 51. The ottoman 40 is supported by the seat cushion 4 to be pivotable about a fifth axis A5 which coincides with the first ottoman cross member 45.

In the present embodiment, the ottoman 40 is disposed to be offset leftward relative to the seat cushion 4. Specifically, the left side edge of the ottoman 40 is disposed at the same position as the left side edge of the seat cushion 4 in the left-right direction. The right side edge of the ottoman 40 is offset leftward relative to the right side edge of the seat cushion 4 in the left-right direction. At the right end of the front end portion of the seat cushion 4, an operation lever 28 for releasing the lock device 26 is provided. The operation lever 28 and the ottoman 40 are arranged so as not to overlap with each other as seen from front (see FIG. 8).

As shown in FIG. 2, an angle adjustment device 52 is provided between the first ottoman cross member 45 and the left or right ottoman side member 46. The angle adjustment device 52 maintains the ottoman side members 46 at an arbitrary angle relative to the first ottoman cross member 45. The angle adjustment device 52 may be embodied by a known device and is preferably a device which restricts the pivoting with friction force and permits the pivoting of the ottoman side members 46 relative to the first ottoman cross member 45 when a torque greater than or equal to a predetermined value is applied, for example. Also, the angle adjustment device 52 may be configured to include a lock mechanism for restricting the pivoting of the ottoman side members 46 relative to the first ottoman cross member 45 and an operation input part for receiving operation of the user, wherein when the operation input part is operated, the lock mechanism permits the pivoting of the ottoman side members 46 relative to the first ottoman cross member 45.

A headrest 54 is provided at an upper portion of the seatback 3. The headrest 54 includes a headrest frame 55 forming a skeleton, left and right headrest pillars 56 extending from the headrest frame 55, a pad (not shown in the drawings) supported on the headrest frame 55, and a skin member 57 covering the pad. The headrest frame 55 and the left and right headrest pillars 56 are integrally formed by bending a rod-shaped metal member. The upper member 22 is provided with headrest pillar receiving parts 58 which receive the left and right headrest pillars 56. Thereby, the headrest 54 is supported by the upper member 22 via the headrest pillar receiving parts 58. The headrest 54 is supported on the seatback 3 to be movable in the up-down direction.

As shown in FIGS. 1 and 2, left and right armrests 61 are pivotably provided on left and right side portions of the seatback 3. Each armrest 61 includes an armrest frame 62 and a skin member 63 covering the armrest frame 62. A pad may be interposed between the armrest frame 62 and the skin member 63. Armrest support parts 64 each having a plate-shape are joined to intermediate portions of the left and right back side members 21 in the longitudinal direction. The left and right armrest support parts 64 support the laterally corresponding armrest frames 62 to be pivotable about a sixth axis A6 which extends laterally. The left and right armrests 61 pivot between a use position in which the armrests 61 protrude forward from the left and right back side members 21 which extend vertically and a stowed position in which the armrests 61 extend upward along the left and right back side members 21.

The position of one of the left and right armrests 61 in the left-right direction overlaps with the position of the ottoman 40 in the left-right direction. In the present embodiment, the position of the left armrest 61 in the left-right direction overlaps with the position of the ottoman 40 in the left-right direction.

Figure 3:
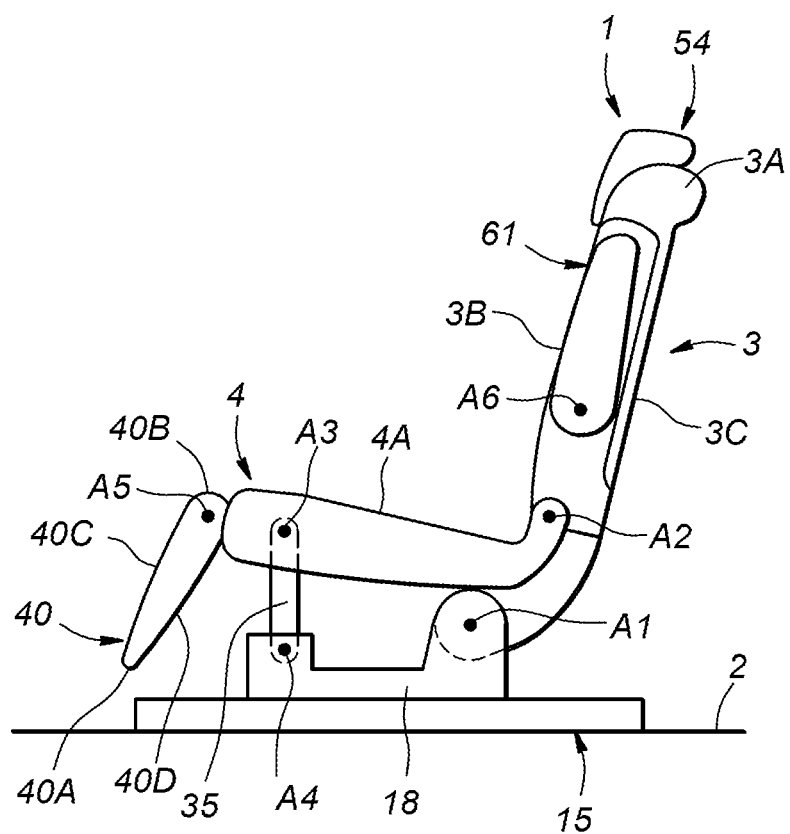
FIG. 3 is a side view showing a use state of the seat.

As shown in FIG. 3, in the use state of the seat 1, when the user operates the operation levers 28, 29, the lock devices 26 are operated by the control cables and the lock devices 26 are released. Thereby, the seatback 3 is enabled to pivot relative to the base side members 18 and the floor 2. In this state, if the user pushes the upper portion of the seatback 3 forward, the seatback 3 pivots forward about the first axis A1. At this time, the second axis A2 moves forward and downward together with the seatback 3, and therefore, the seat cushion 4 moves forward and downward. The seat cushion 4 moves substantially in parallel, with the moving direction thereof being restricted by the links 35.

Figure 4:
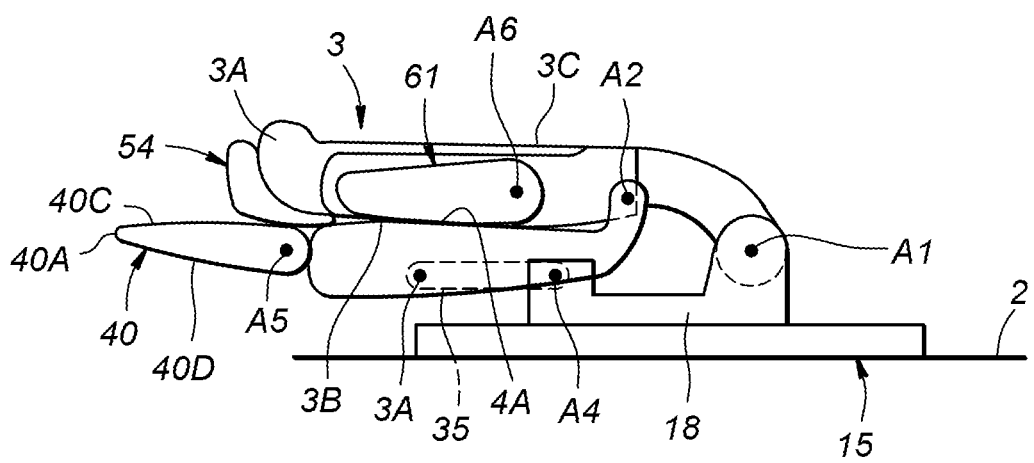
FIG. 4 is a side view showing a stowed state of the seat.

As shown in FIG. 4, when the seat 1 is in the stowed state, the front surface 3B and the rear surface 3C of the seatback 3 extend horizontally. Also, an upper surface 4A (seating surface) of the seat cushion 4 extends horizontally and contacts the front surface 3B of the seatback 3. The seat cushion 4 and the seatback 3 overlap with each other in the up-down direction. The seat cushion 4 in the stowed state is disposed more forward and downward than the seat cushion 4 in the use state. When the seat 1 is in the stowed position, the shoulder portion 3A constituting the front end of the seatback 3 is positioned more forward than the front end of the seat cushion 4. In the stowed state, the seatback 3 extends more forward than the seat cushion 4.

As shown in FIG. 3, with the left and right ottoman side members 46 pivoting relative to the first ottoman cross member 45, the ottoman 40 can pivot relative to the seat cushion 4. In the ottoman 40, a portion where the second ottoman cross member 47 is disposed is referred to as a tip end portion 40A, and a portion where the first ottoman cross member 45 is disposed is referred to as a base end portion 40B. The ottoman 40 pivots between a lower limit position where the ottoman 40 extends downward from the base end portion 40B to the tip end portion 40A and an upper limit position where the ottoman 40 extends upward from the base end portion 40B to the tip end portion 40A. For example, the ottoman 40 may extend vertically downward in the lower limit position and may extend vertically upward in the upper limit position. Also, the ottoman 40 may extend upward and rearward in the upper limit position.

A surface of the ottoman 40 that is disposed on the front side in the lower limit position is referred to as a support surface 40C. When the seat 1 is in the use state, the support surface 40C can support the lower limbs of the seated person from below. When the ottoman 40 is in a horizontal position between the upper limit position and the lower limit position, the support surface 40C is disposed horizontally and faces upward.

Preferably, when the ottoman 40 is in the horizontal position, the support surface 40C is disposed at the same height as the front end of the upper surface 4A of the seat cushion 4. Also, when the ottoman 40 is in the horizontal position, the support surface 40C may be disposed on the same plane as the upper surface 4A of the seat cushion 4.

When switching the seat 1 from the use state to the stowed state, the user disposes the ottoman 40 in a horizontal position. During the process of switching the seat 1 from the use state to the stowed state, the ottoman 40 is maintained in the horizontal position. Therefore, as shown in FIG. 4, when the seat 1 is in the stowed state, the ottoman 40 is disposed in the horizontal position.

When the seat 1 is in the stowed state, the ottoman 40 is pivotable relative to the seat cushion 4. The pivoting range of the ottoman 40 is restricted by the seatback 3 and the floor 2. When the seat 1 is in the stowed state and the ottoman 40 is in the horizontal position, the tip end portion 40A of the ottoman 40 is disposed more forward than the shoulder portion 3A (upper end portion) of the seatback 3 and more forward than the upper end portion of the headrest 54. Namely, in the stowed state of the seat 1, the support surface 40C of the ottoman 40 protrudes more forward than the seatback 3 and the headrest 54.

In the seat 1 of the present embodiment, baggage can be placed on the rear surface 3C of the seatback 3 in the stowed state of the seat 1. Also, since the support surface 40C of the ottoman 40 faces upward and extends more forward than the seatback 3, baggage can be placed on the support surface 40C of the ottoman 40. Namely, the support surface 40C of the ottoman 40 can expand the area where baggage can be placed. Thus, the ottoman 40 functions as an article placement part and baggage can be placed on the support surface 40C. Since the ottoman 40 is used as an article placement part, there is no need to attach a new component to the seat 1. Therefore, the seat 1 can be made compact.

The ottoman 40 can pivot to an angle suitable for supporting the legs of the seated person and to an angle suitable for supporting baggage. Also, since the ottoman is pivotable relative to the seat cushion 4 in the stowed state of the seat 1, it is possible to change the angle of the ottoman 40 in accordance with the shape of the baggage after the seat 1 is brought into the stowed state.

When the ottoman 40 is in the horizontal position, the support surface 40C is disposed at the same height as the front end of the upper surface 4A of the seat cushion 4, and therefore, a step between the support surface 40C and the rear surface 3C of the seatback 3 can be made small in the stowed state.

In the stowed state, since the seatback 3 extends more forward than the seat cushion 4, the seatback 3 can cover the upper surface 4A of the seat cushion 4, whereby the upper surface 4A of the seat cushion 4 can be protected. Also, the rear surface 3C of the seatback 3 can be expanded.

Figure 5:
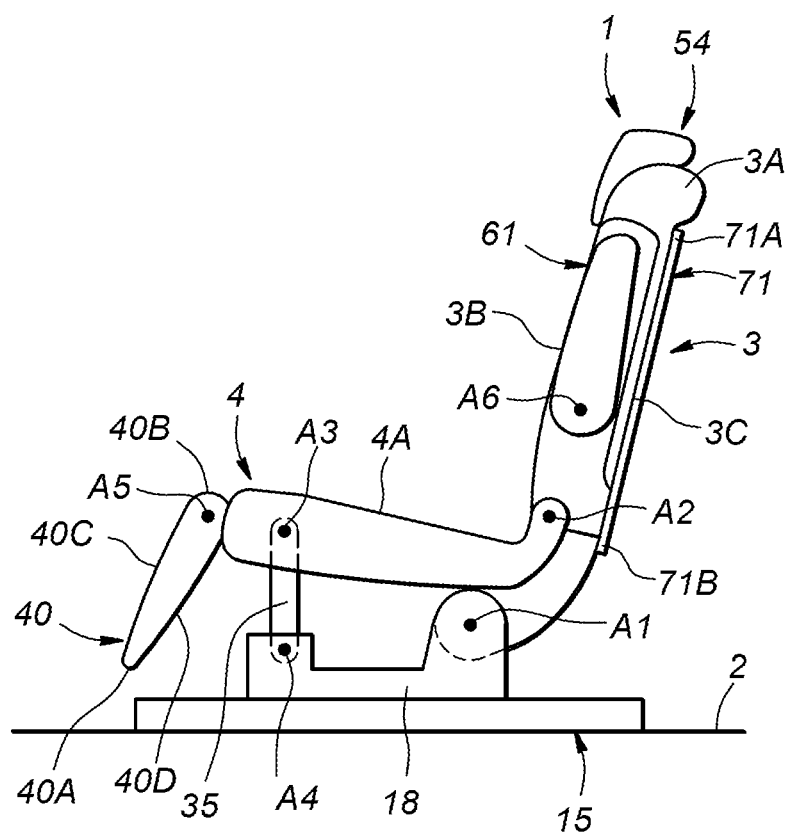
FIG. 5 is a side view showing the use state of the seat provided with a protective cover.
Figure 6:
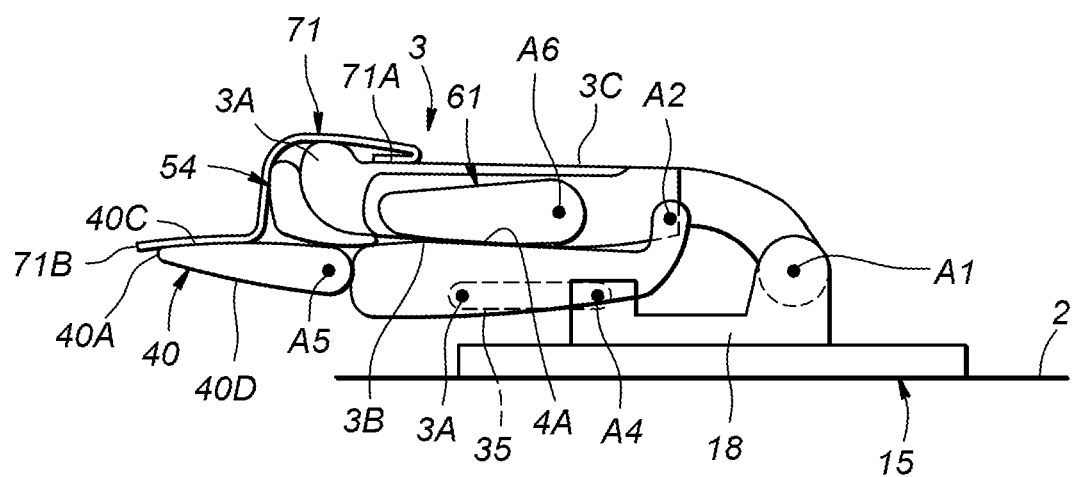
FIG. 6 is a side view showing the stowed state of the seat provided with a protective cover.

As shown in FIG. 5, preferably, a flexible protective cover 71 is mounted on the rear surface 3C of the seatback 3. The protective cover 71 preferably has a base end 71A joined to the rear surface 3C of the seatback 3 and a free end 71B. When the seat 1 is in the use state, the base end 71A is disposed above the free end 71B and the protective cover 71 is suspended. Preferably, the free end 71B of the protective cover 71 is detachably locked to the rear surface 3C of the seatback 3 by a locking member such as a hook-and-loop fastener. Preferably, the width of the protective cover 71 in the left-right direction is substantially the same as the width of the seatback 3 in the left-right direction. As shown in FIG. 6, when the seat 1 is in the stowed position, the protective cover 71 is preferably folded back forward to cover the support surface 40C of the ottoman 40. Thereby, the protective cover 71 can protect the support surface 40C of the ottoman 40.

Figure 7:
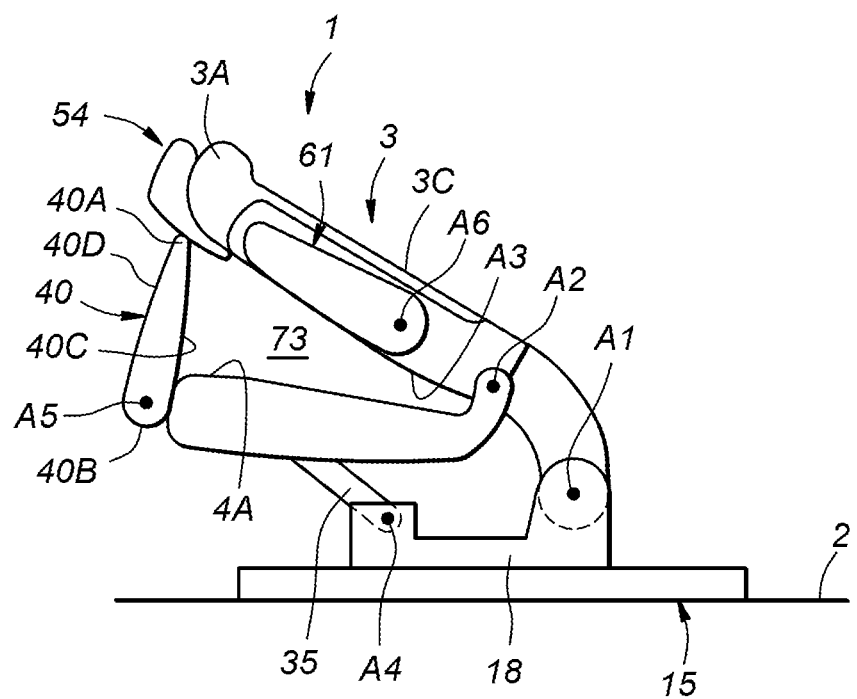
FIG. 7 is a side view showing an intermediate state of the seat.

As shown in FIG. 7, when the seatback 3 pivots forward in a state in which the ottoman 40 is inclined upward from the horizontal position, the seatback 3 or the headrest 54 comes into contact with the ottoman 40 and the pivoting of the seatback 3 is restricted. As a result, the seat 1 is in an intermediate state between the use state and the stowed state. In the intermediate state of the seat 1, the seatback 3 is inclined forward and upward. In the intermediate state of the seat 1, a triangular accommodation space 73 is defined by the front surface 3B of the seatback 3, the upper surface 4A of the seat cushion 4, and the support surface 40C of the ottoman 40. Baggage can be disposed in the accommodation space 73. By changing the angle of the ottoman 40 relative to the horizontal plane, it is possible to change the angle of the seatback 3 relative to the horizontal plane in the intermediate state. For example, the ottoman 40 may be disposed to extend vertically upward relative to the seat cushion 4.

Figure 8:
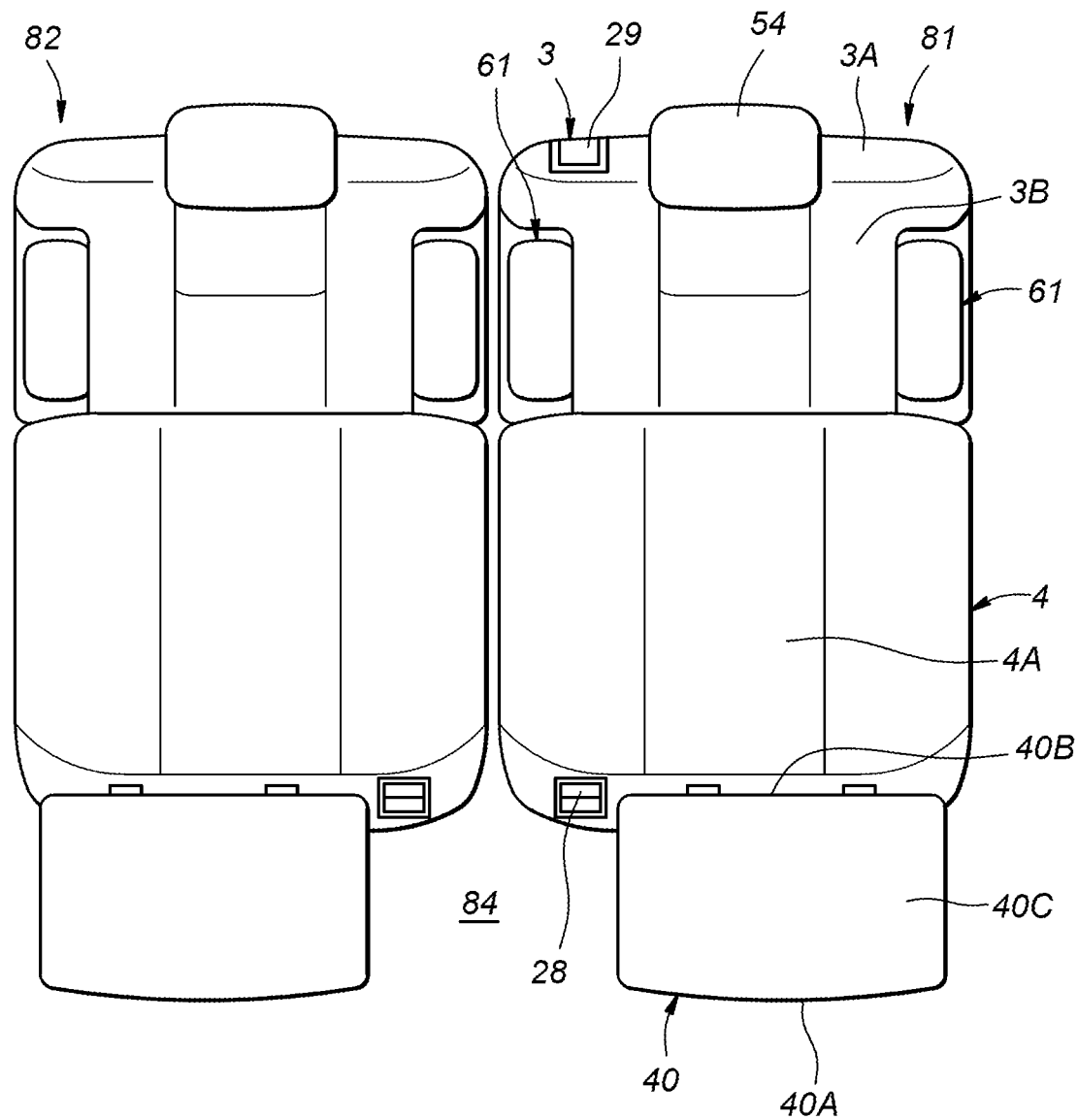
FIG. 8 is a plan view showing a left seat and a right seat.

The seats 1 according to the embodiment may be arranged side by side on left and right. As shown in FIG. 8, for example, the seat 1 according to the embodiment may constitute a left seat 81 in the rear row, and a right seat 82 having a mirror-image structure of the seat 1 according to the embodiment may be disposed to the right of the left seat 81. Preferably, the left seat 81 and the right seat 82 contact each other in the left-right direction. Specifically, the right side edge of the seat cushion 4 of the left seat 81 contacts the left side edge of the seat cushion 4 of the right seat 82, and the right side edge of the seatback 3 of the left seat 81 contacts the left side edge of the seatback 3 of the right seat 82. By making the left seat 81 and the right seat 82 contact each other, it is possible to expand the area where baggage can be placed.

Between the ottoman 40 of the left seat 81 and the ottoman 40 of the right seat 82, a gap 84 is formed. When the left seat 81 and the right seat 82 are in the stowed state, the gap 84 between the left and right ottomans 40 is maintained. Therefore, baggage can be inserted in the gap 84 between the left and right ottomans 40 so that the baggage can be fixed.

Figure 9:
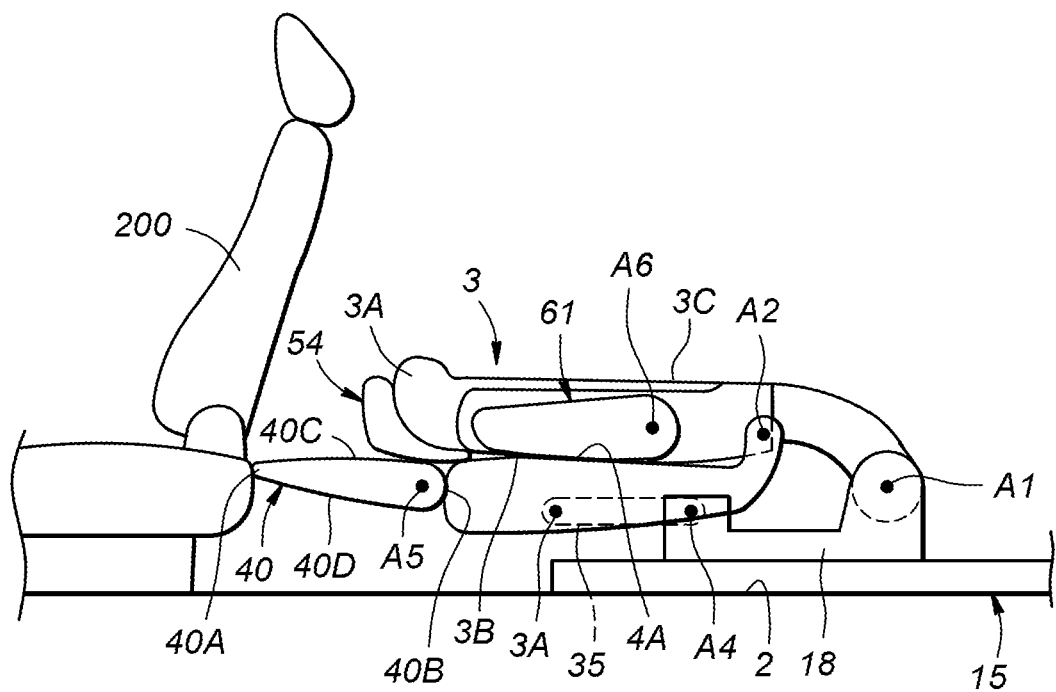
FIG. 9 is a side view showing a state in which an ottoman of the seat in the stowed state is in contact with a back part of the seat in front thereof.

As shown in FIG. 9, in the stowed state of the seat 1, the front end of the ottoman 40 preferably contacts a back part of another seat 200 disposed in front thereof. Preferably, the front end of the ottoman 40 contacts a back part of the seat cushion or the seatback of the other seat 200. Thereby, no space is formed in front of the seat 1 in the stowed state, and thus, it is possible to prevent baggage from falling to in front of the seat 1. The other seat is preferably a seat constituting a driver's seat or a front passenger seat.

Figure 10:
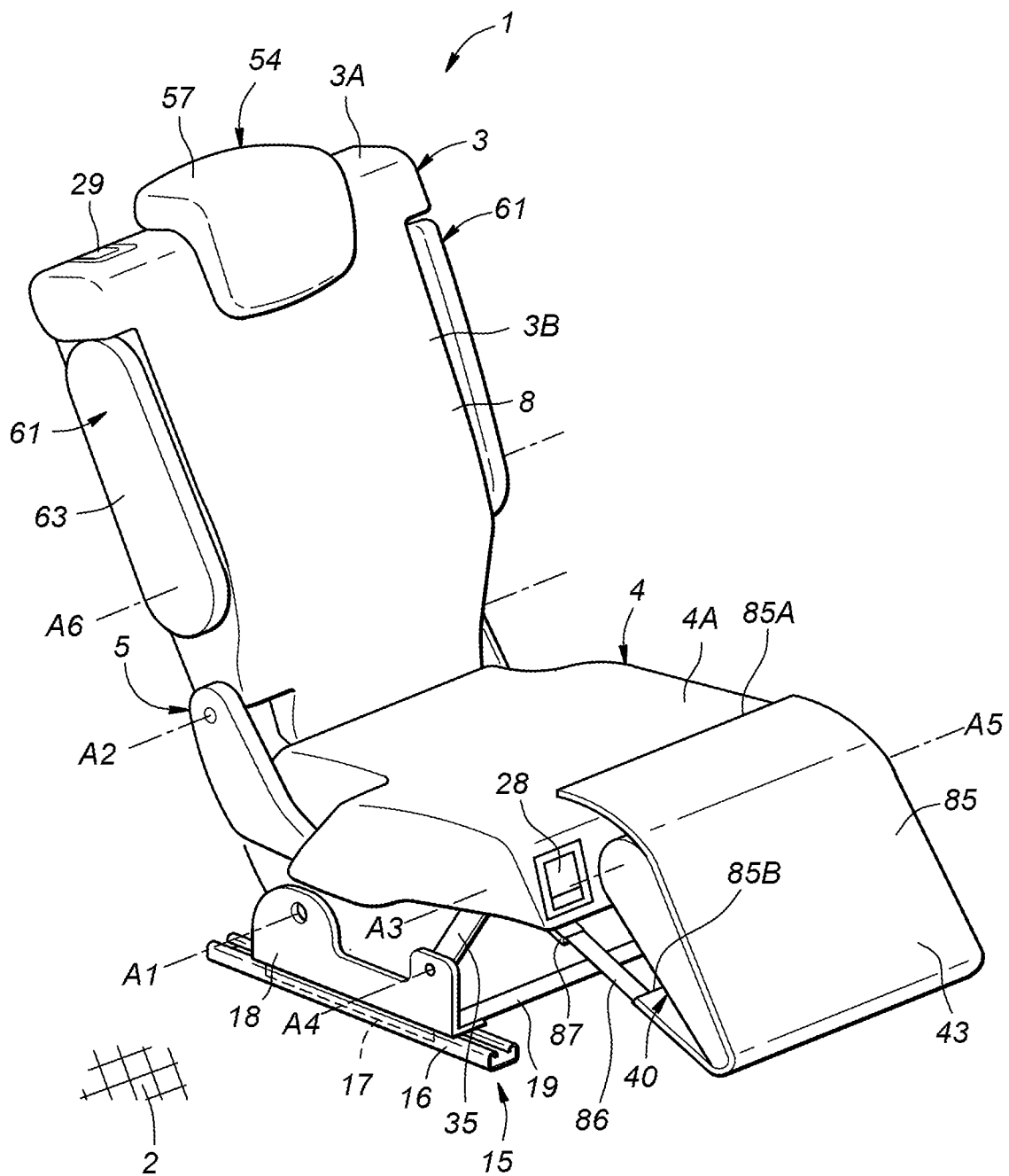
FIG. 10 is a perspective view of a seat fitted with a cover member.

As shown in FIG. 10, the ottoman 40 may be fitted with a cover member 85. The cover member 85 covers the support surface 40C and the backside 40D of the ottoman 40. The cover member 85 is a flexible sheet material made of resin, for example. The cover member 85 is preferably made of material to which other substances such as dirt are difficult to adhere. The cover member 85 has a first edge 85A joined to the front end of the upper surface 4A of the seat cushion 4 and a second edge 85B joined to a lower portion of the seat cushion 4. Preferably, the first edge 85A is detachably joined to the front end of the upper surface 4A of the seat cushion 4 by means of a zip fastener, for example. The cover member 85 extends from the first edge 85A along the support surface 40C of the ottoman 40 to the tip end portion 40A of the ottoman 40, and thereafter extends from the tip end portion 40A of the ottoman 40 along the backside to the second edge 85B. The second edge 85B is joined to the pressure receiving member 37 or the front member from below the seat cushion 4 by means of an elastic member 86 such as rubber. Preferably, the tip of the elastic member 86 is provided with a hook member 87 and is hooked to the pressure receiving member 37 or the front member 32 by the hook member 87. Due to the elastic member 86, the cover member 85 can extend along the ottoman 40 without loosening even when the ottoman 40 pivots.

Figure 11:
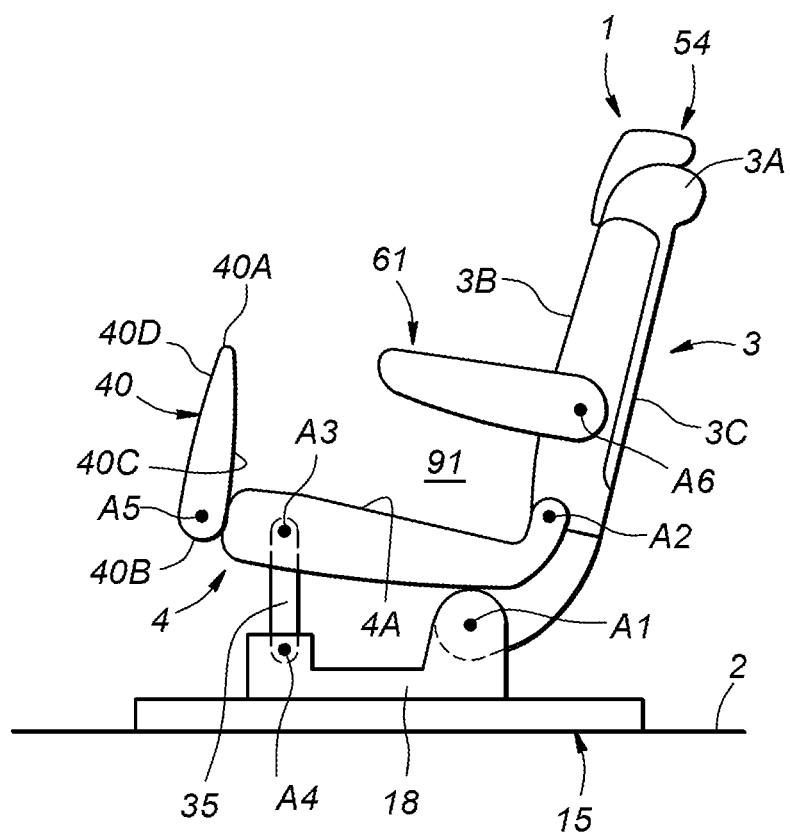
FIG. 11 is a side view of a seat forming a baggage accommodation space.

As shown in FIG. 11, in the use state of the seat 1, a baggage accommodation space 91 is formed when the ottoman 40 is disposed in an upper position in which the ottoman 40 is pivoted higher than the horizontal position. The baggage accommodation space 91 is defined by the seat cushion 4, the seatback 3, the ottoman 40, and the left and right armrests 61. The baggage accommodation space 91 is a recess that opens upward. The upper position of the ottoman 40 may be the same as the upper limit position of the ottoman 40. When the ottoman 40 is in the upper position, the tip of the ottoman 40 is preferably disposed higher than the lower edge of the tip of the armrest 61 in the use position. Also, when the ottoman 40 is in the upper position, the tip of the ottoman 40 may be disposed higher than the upper edge of the tip of the armrest 61 in the use position.

Figure 12:
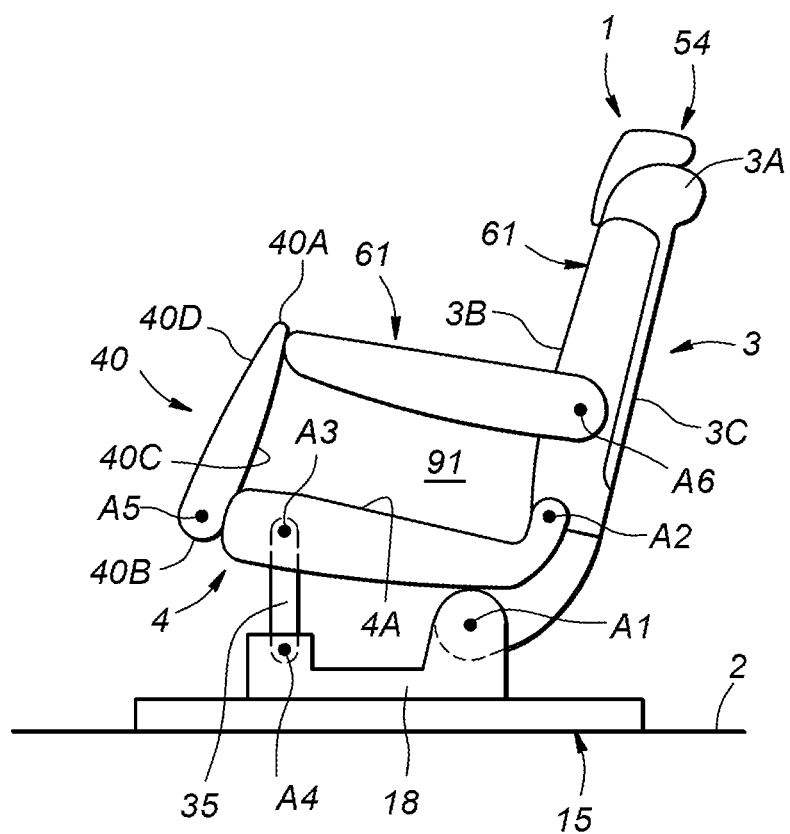
FIG. 12 is a side view of a seat forming a baggage accommodation space.

As shown in FIG. 12, when the ottoman 40 is in the upper position, the ottoman 40 preferably contacts at least one of the armrests 61 in the use position. Namely, the lengths of the ottoman 40 and the armrest 61 are set such that the ottoman and the armrest 61 can contact each other. Thereby, the baggage is difficult to fall from between the ottoman 40 and the armrest 61. In the upper position, the ottoman 40 may extend rearward and upward from the front end of the seat cushion 4.

Figure 13:
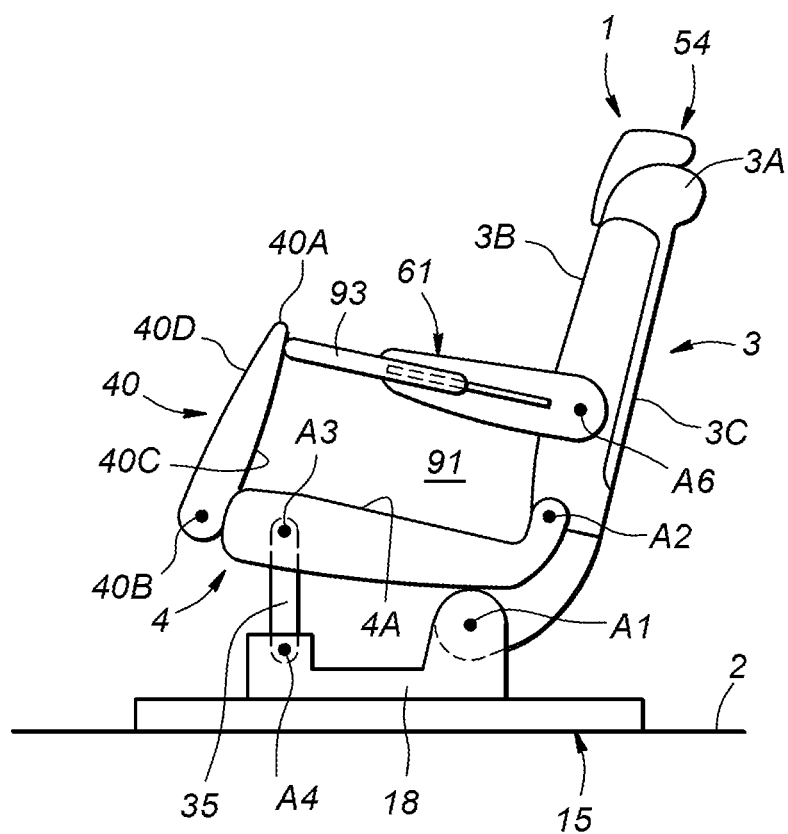
FIG. 13 is a side view of a seat forming a baggage accommodation space.

As shown in FIG. 13, the armrest 61 may be provided with a first movable member 93. The first movable member 93 is supported by the armrest 61 to be slidingly movable in the longitudinal direction of the armrest 61. The first movable member 93 may protrude from the tip end portion of the armrest 61 in the longitudinal direction so that the first movable member 93 contacts the ottoman 40 in the upper position.

Figure 14:
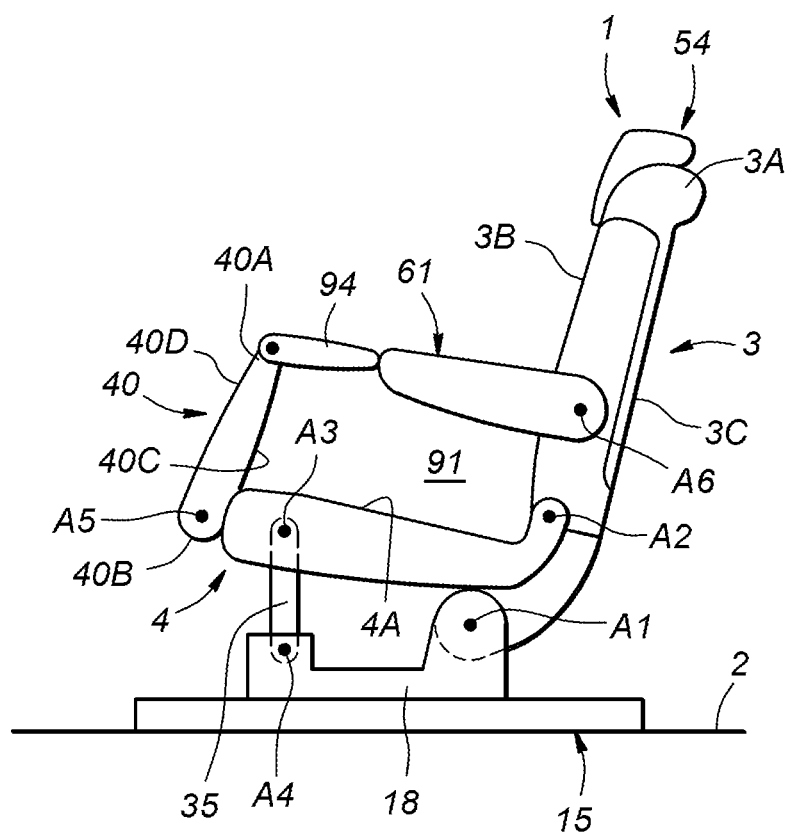
FIG. 14 is a side view of a seat forming a baggage accommodation space.

As shown in FIG. 14, the ottoman 40 may be provided with a second movable member 94. The second movable member 94 is supported by the ottoman 40 to be pivotable about an axis that extends laterally at the tip of the ottoman 40. The second movable member 94 has a lateral width as that of the ottoman 40. When the ottoman 40 is in the upper position, the second movable member 94 may extend rearward from the tip of the ottoman 40 to contact the armrest 61.

Figure 15:
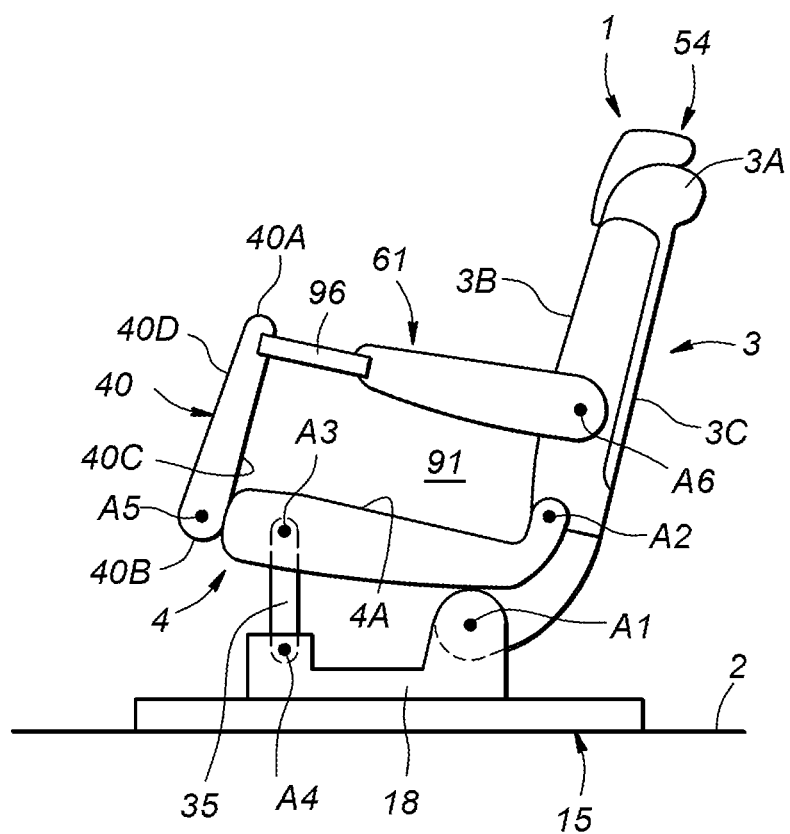
FIG. 15 is a side view of a seat forming a baggage accommodation space.

As shown in FIG. 15, when the seat 1 is in the use state and the ottoman 40 is in the upper position, the ottoman 40 and the armrest 61 may be connected by a first coupling member 96. The first coupling member 96 may be a linear member, such as a rope and a rubber cord, a planar member, such as a woven fabric, an unwoven fabric, and a sheet material, a net member, or the like. The first coupling member 96 is detachably joined to the ottoman 40 and the armrest 61.

Figure 16:
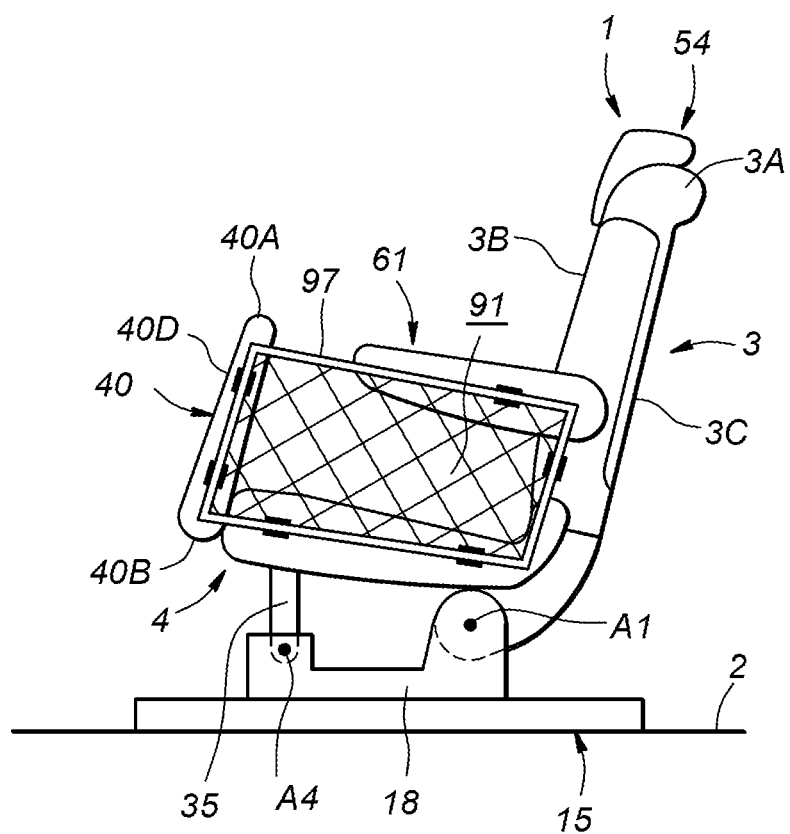
FIG. 16 is a side view of a seat forming a baggage accommodation space.

As shown in FIG. 16, when the seat 1 is in the use state and the ottoman 40 is in the upper position, the ottoman 40, the armrest 61, the seat cushion 4, and the seatback 3 may be connected by a second coupling member 97. The second coupling member 97 may be a planar member, such as a woven fabric, an unwoven fabric, and a sheet material, a net member, or the like. The second coupling member 97 is preferably formed of a frame part and a net part which is stretched inside the frame part, for example. The second coupling member 97 is detachably joined to the ottoman 40, the armrest 61, the seat cushion 4, and the seatback 3. Here, with the ottoman 40, the armrest 61, the seat cushion 4, and the seatback 3 being coupled by the second coupling member 97, the ottoman 40 and the armrest 61 may contact each other or may be separated from each other. Also, with the ottoman 40, the armrest 61, the seat cushion 4, and the seatback 3 being coupled by the second coupling member 97, the tip of the ottoman 40 may be disposed higher or lower than the lower edge of the tip of the armrest 61.

The first coupling member 96 and the second coupling member 97 prevent the baggage placed in the baggage accommodation space 91 from falling to the left and right.

Figure 17:
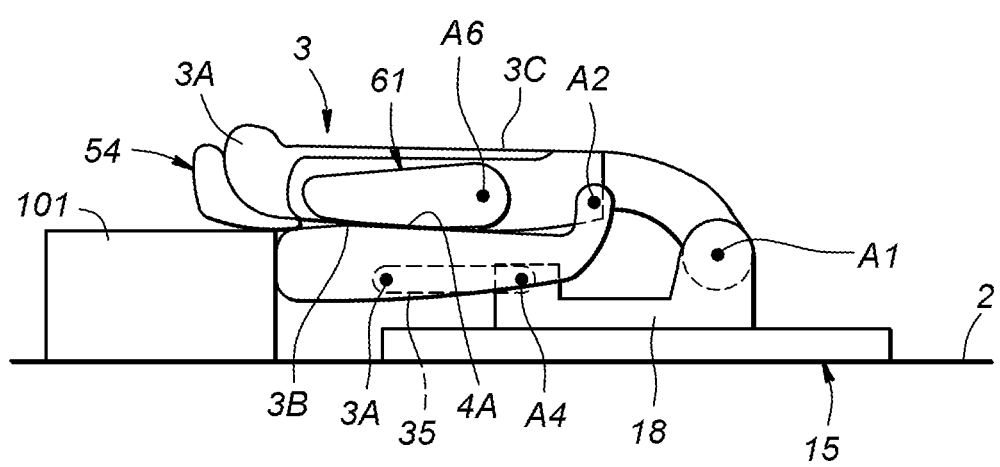
FIG. 17 is a side view of a seat provided with a box body as a baggage placement part.

The present invention may be modified in various ways without being limited to the above embodiments. In another embodiment, instead of the ottoman 40, a box body 101 may be placed on the floor 2 so that the box body 101 may be used as an article placement part, as shown in FIG. 17. Preferably, the box body 101 is removable from the floor 2 and is disposed in front of the seat cushion 4. An upper surface of the box body 101 preferably forms a support surface.

Figure 18:
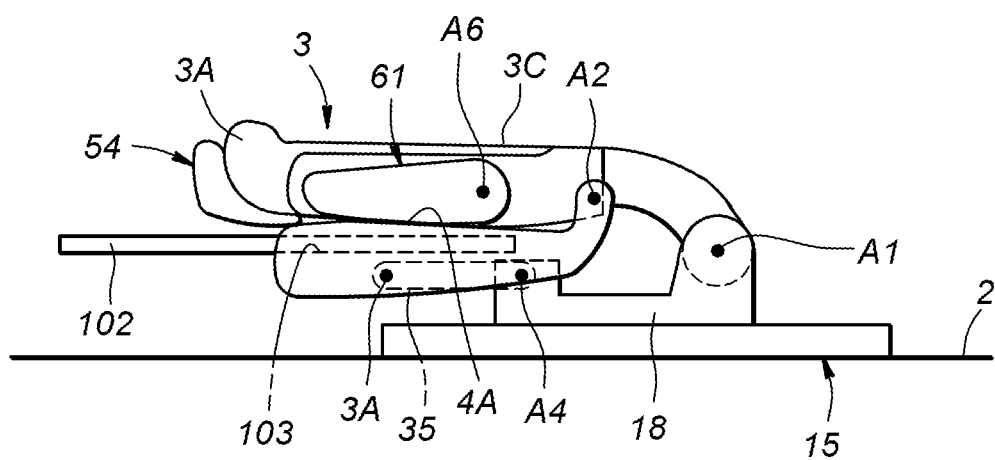
FIG. 18 is a side view of a seat provided with a support plate as a baggage placement part.

Also, instead of the ottoman 40, a support plate 102 may be provided in the seat cushion 4 so as to be slidingly movable in the fore and aft direction, as shown in FIG. 18. When the seat 1 is in the stowed state, the support plate 102 is preferably pulled out forward of the seat cushion 4 to form an article placement part. Preferably, the front end of the seat cushion 4 is formed with a slot 103 receiving the support plate 102. When the seat 1 is in the use state, the support plate 102 is preferably received in the slot 103.

In the above-described seat 1, the slide device 15 may be omitted. In this case, the base side members 18 are preferably joined to the floor 2 directly. Namely, the seatback 3 may be directly provided on the floor 2 to be pivotable or may be indirectly provided on the floor 2 via the slide device 15 to be pivotable.

In another embodiment, the seat cushion 4 may be supported on the floor 2 and the seatback 3 may be pivotably supported on the seat cushion. In this case, the slide device 15 may be interposed between the floor 2 and the seat cushion 4.

Figure 19:
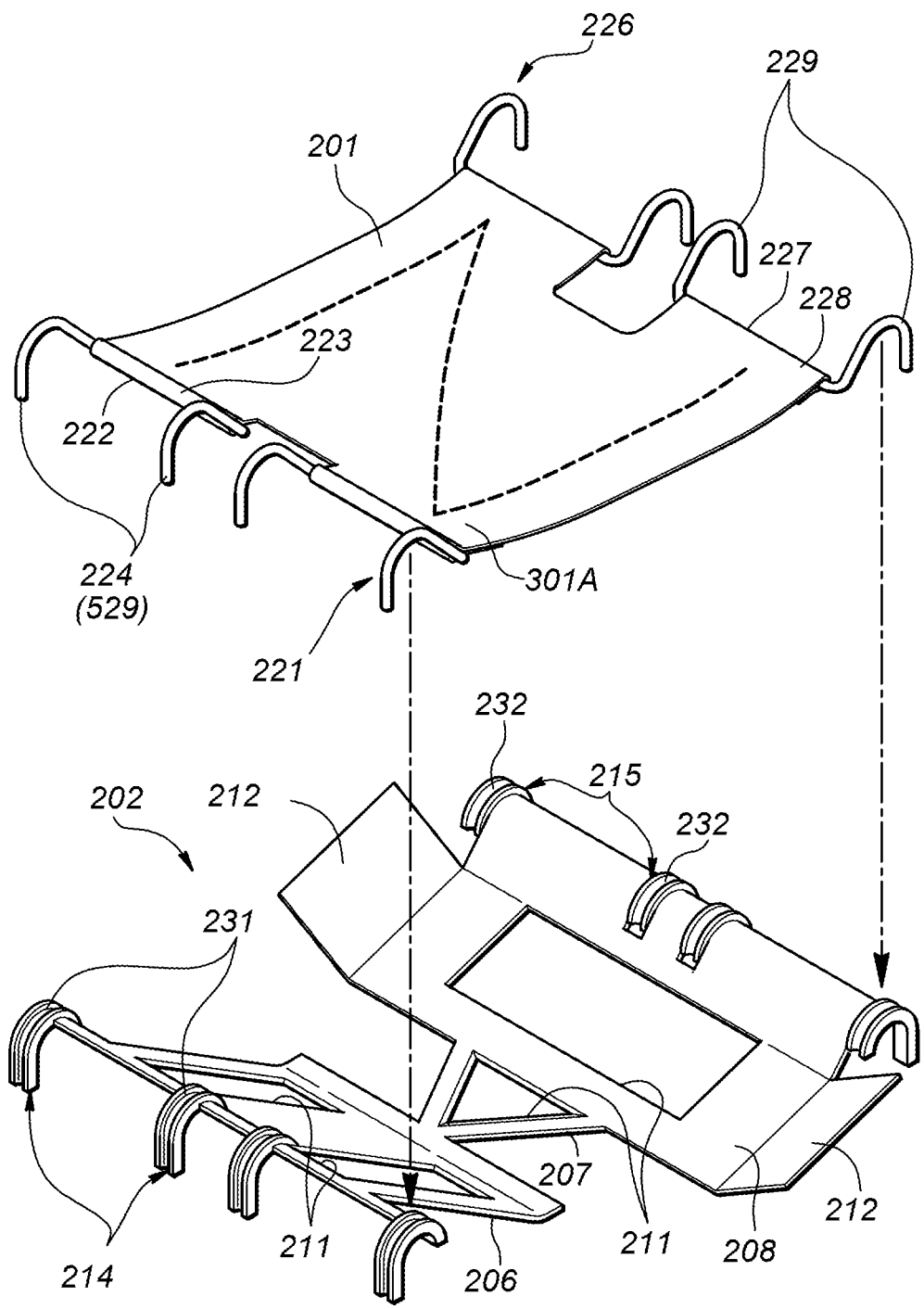
FIG. 19 is a perspective view showing a pressure receiving member.
Figure 20:
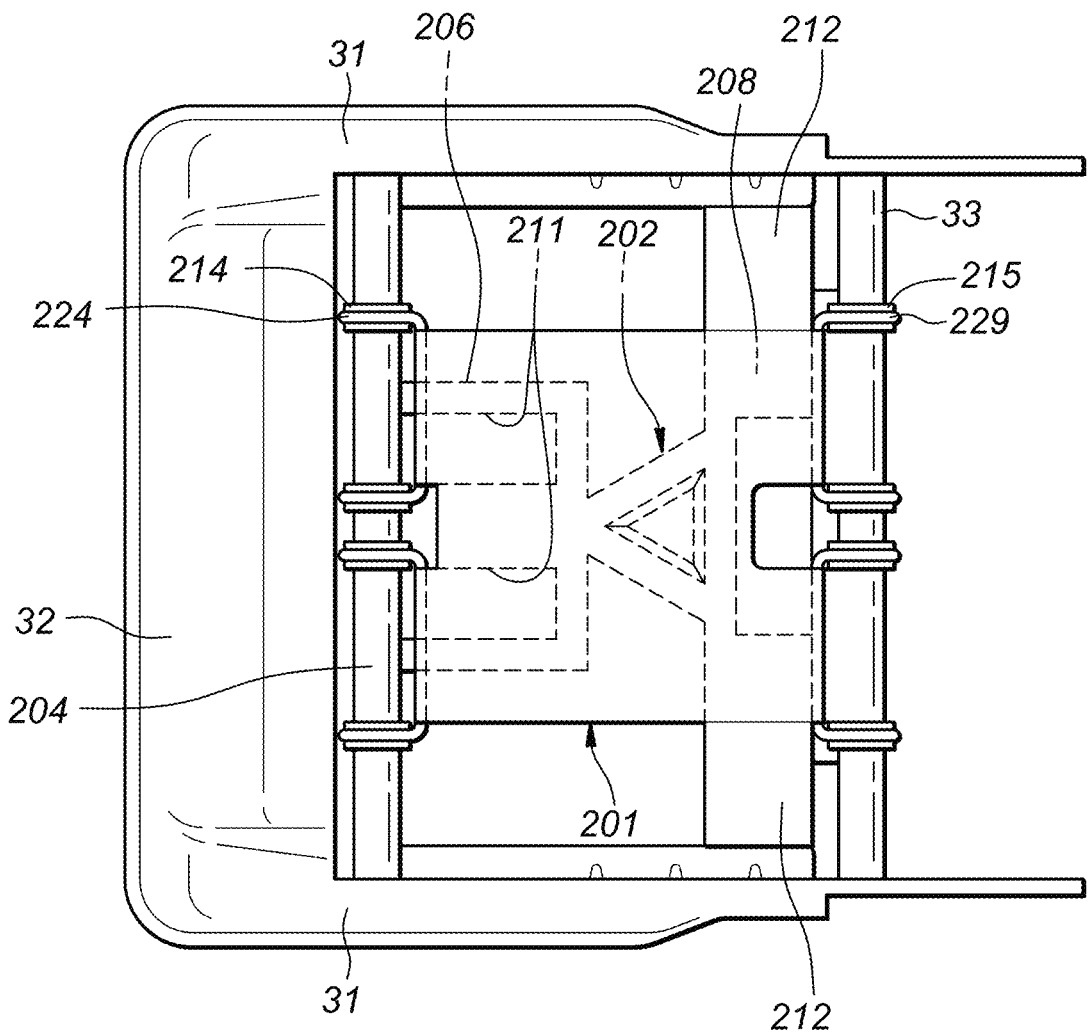
FIG. 20 is a plan view showing the seat cushion frame and the pressure receiving member.

Also, in the embodiment shown in FIG. 10, the pressure receiving member 37 may include, instead of the S-spring s, a sheet-shaped member 201 and a support member 202. As shown in FIGS. 19 and 20, the support member 202 extends in the fore and aft direction between a middle member 204 and the rear member 33. The middle member 204 extends laterally behind the front member 32 and is joined to the left and right cushion side members 31. The support member 202 has surfaces facing upward and downward and the front edge and the rear edge thereof extend laterally. The support member 202 has flexibility and is made of resin, for example. The support member includes, in order from the front, a front portion 206, an intermediate portion 207, and a rear portion 208. The support member 202 is supported by the middle member 204 at the front portion 206 and is supported by the rear member 33 at the rear portion 208. The intermediate portion 207 extends substantially horizontally, the front portion 206 extends forward and upward from the intermediate portion 207 toward the front member 32, and the rear portion 208 extends rearward and upward from the intermediate portion 207 toward the rear member 33. The lateral width of the intermediate portion 207 is preferably set to be smaller than the lateral width of each of the front portion 206 and the rear portion 208. In the present embodiment, the intermediate portion 207 is formed in a triangular shape so that the lateral width becomes smaller toward the front. Also, each of the front portion 206 and the rear portion 208 is formed in a substantially rectangular shape. The lateral width of the front portion 206 is smaller than the lateral width of the rear portion 208. Preferably, each of the front portion 206, the intermediate portion 207, and the rear portion 208 is formed with at least one lightening hole 211. The shape of the front portion 206, the intermediate portion 207, the rear portion 208, and the lightening hole 211 may be set arbitrarily.

At a right part and a left part of the rear portion 208, left and right extension pieces 212 which extend laterally and upward from the side edges of the rear portion 208 are provided. The left and right extension pieces 212 extend to above the cushion side members 31.

The front edge of the front portion 206 of the support member 202 is provided with multiple first hook parts 214 for engagement with the middle member 204. As seen in the left-right direction, each of the first hook parts 214 is formed in a semicircular shape that opens downward. The rear edge of the rear portion 208 of the support member 202 is provided with a second hook part 215 for engagement with the rear member 33. The second hook part 215 extends laterally along the rear edge of the rear portion 208 of the support member 202. As seen in the left-right direction, the second hook part 215 is formed in a semicircular shape that opens downward. With the multiple first hook parts 214 engaging with the middle member and the second hook part 215 engaging with the rear member 33, the support member 202 is disposed to extend between the middle member 204 and the rear member 33.

The sheet-shaped member 201 is disposed to extend between the middle member 204 and the rear member 33. The front edge of the sheet-shaped member 201 is provided with at least one front locking part 221. The front locking part 221 is formed by bending a metal rod. The front edge of the sheet-shaped member 201 is folded back and sutured to form multiple front loop parts 222. Each front loop part 222 extends laterally. The front locking part 221 includes a shaft portion 223 pivotably supported in the front loop part 222 and left and right third hook parts 224 extending forward from the respective ends of the shaft portion 223. As seen in the left-right direction, each third hook part 224 is formed in a semicircular shape that opens downward.

The rear edge of the sheet-shaped member 201 is provided with at least one rear locking part 226. The rear locking part 226 is formed by bending a metal rod. The rear edge of the sheet-shaped member 201 is folded back and sutured to form multiple rear loop parts 227. Each rear loop part 227 extends laterally. The rear locking part 226 includes a shaft portion 228 pivotably supported in the rear loop part 227 and left and right fourth hook parts 229 extending rearward from the respective ends of the shaft portion 228. As seen in the left-right direction, each fourth hook part 229 is formed in a semicircular shape that opens downward.

The front locking part 221 of the sheet-shaped member 201 is locked to the first hook parts 214 of the support member 202 and is locked to the middle member 204 via the first hook parts 214. The upper surface of each first hook part 214 of the support member 202 is formed with a front engagement groove 231 for receiving the third hook part 224. The front engagement groove 231 extends in the fore and aft direction along the upper surface of the first hook part 214. With each third hook part 224 being fitted in the corresponding front engagement groove 231, the position of the front locking part 221 in the left-right direction relative to the first hook part 214 is determined.

The rear locking part 226 of the sheet-shaped member 201 is locked to the second hook part 215 of the support member 202 and is locked to the rear member 33 via the second hook part 215. The upper surface of the second hook part 215 of the support member 202 is formed with rear engagement grooves 232 for receiving the fourth hook parts 229. Each rear engagement groove 232 extends in the fore and aft direction along the upper surface of the second hook part 215. With each fourth hook part 229 being fitted in the corresponding rear engagement groove 232, the position of the rear locking part 226 in the left-right direction relative to the second hook part 215 is determined.

In a state in which no load is applied to the upper surface of the seat cushion 4, a central part 301C of the sheet-shaped member 201 in the front-rear direction is located in a position spaced from the intermediate portion 207 of the support member 202. As the load applied to the upper surface of the seat cushion 4 increases, the sheet-shaped member 201 flexes downward and the sheet-shaped member 201 is supported by the upper surface of the support member 202.

The hook member 87 connected to the end portion of the cover member 85 via the elastic member 86 is preferably locked to the support member 202. The hook member 87 is preferably locked to the rear edge of the front portion 206 of the support member 202 or the hole edge of the lightening hole 211.

Figure 21:
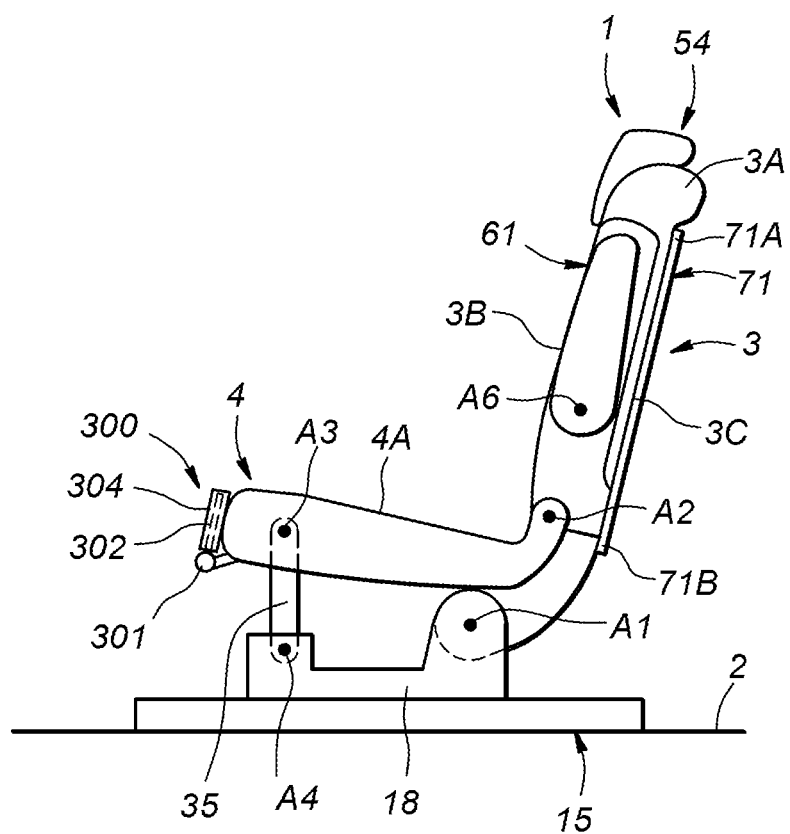
FIG. 21 is a side view showing the stowed state of the baggage placement part.

In another embodiment, as shown in FIG. 21, the front end of the seat cushion 4 may be provided with an article placement part 300 instead of the ottoman 40. The article placement part 300 includes a pivot shaft 301 extending laterally at the front end of the seat cushion 4, left and right support shafts 302 pivotably supported by the pivot shaft 301 and extending in the radial direction of the pivot shaft 301, and a plate member 304 supported by the left and right support shafts 302 to be slidingly movable. The pivot shaft 301 is provided in a lower portion of the front end of the seat cushion. The left and right support shafts 302 pivot between a horizontal position in which the left and right support shafts 302 extend forward from the front end of the seat cushion and a vertical position in which the left and right support shafts 302 extend upward from the front end of the seat cushion. The plate member 304 is provided along a plane containing the left and right support shafts 302. When the support shafts 302 are in the horizontal position, the surface of the plate member 304 faces in the up-down direction, and when the support shafts 302 are in the vertical position, the surface of the plate member 304 faces in the fore and aft direction. The plate member 304 is provided on the left and right support shafts 302 to be slidingly movable in the extension direction of the support shafts 302. The plate member 304 moves between a contracted position in which the plate member 304 is positioned on the base end side of the support shafts 302 and an extended position in which the plate member 304 is positioned on the tip side of the support shafts 302.

FIG. 21 shows a state in which the support shafts 302 are in the vertical position and the plate member 304 is in the contracted position. In this state, the plate member 304 is disposed along the front end of the seat cushion. At this time, the occupant can be seated on the seat.

Figure 22:
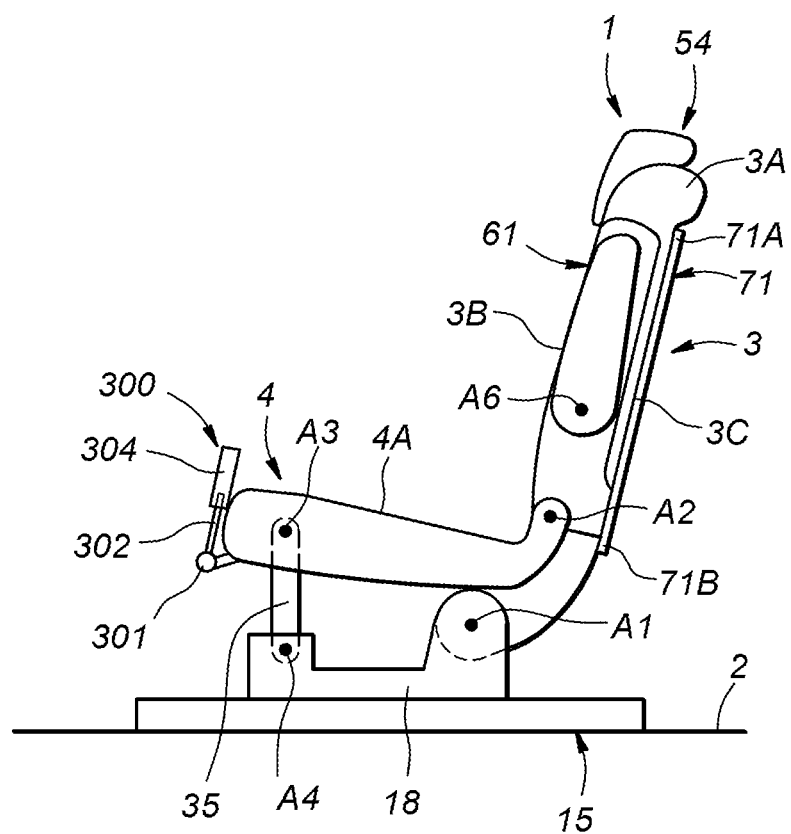
FIG. 22 is a side view showing one example of the use state of the baggage placement part.

FIG. 22 shows a state in which the support shafts 302 are in the vertical position and the plate member 304 is in the extended position. In this state, the plate member 304 protrudes upward from the front end of the seat cushion. At this time, the plate-like member can prevent the baggage disposed on the seat cushion 4 from falling to in front of the seat.

Figure 23:
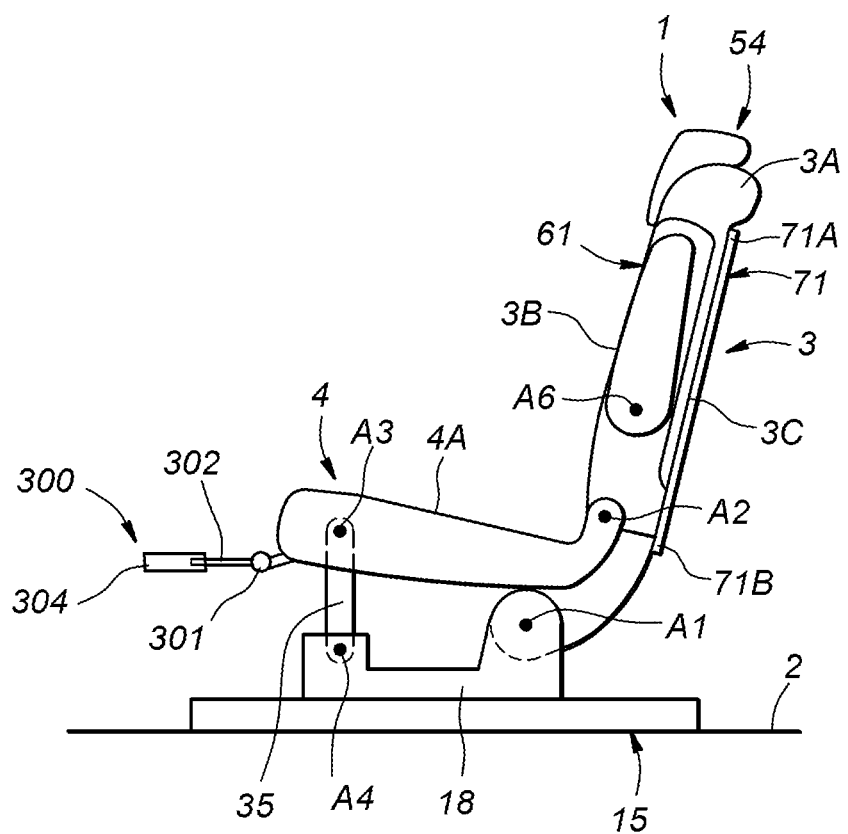
FIG. 23 is a side view showing one example of the use state of the baggage placement part.

FIG. 23 shows a state in which the support shafts 302 are in the horizontal position and the plate member 304 is in the extended position. In this state, the plate member 304 extends forward from the front end of the seat cushion. At this time, the plate-like member can support baggage in front of the seat cushion 4.

Figure 24:
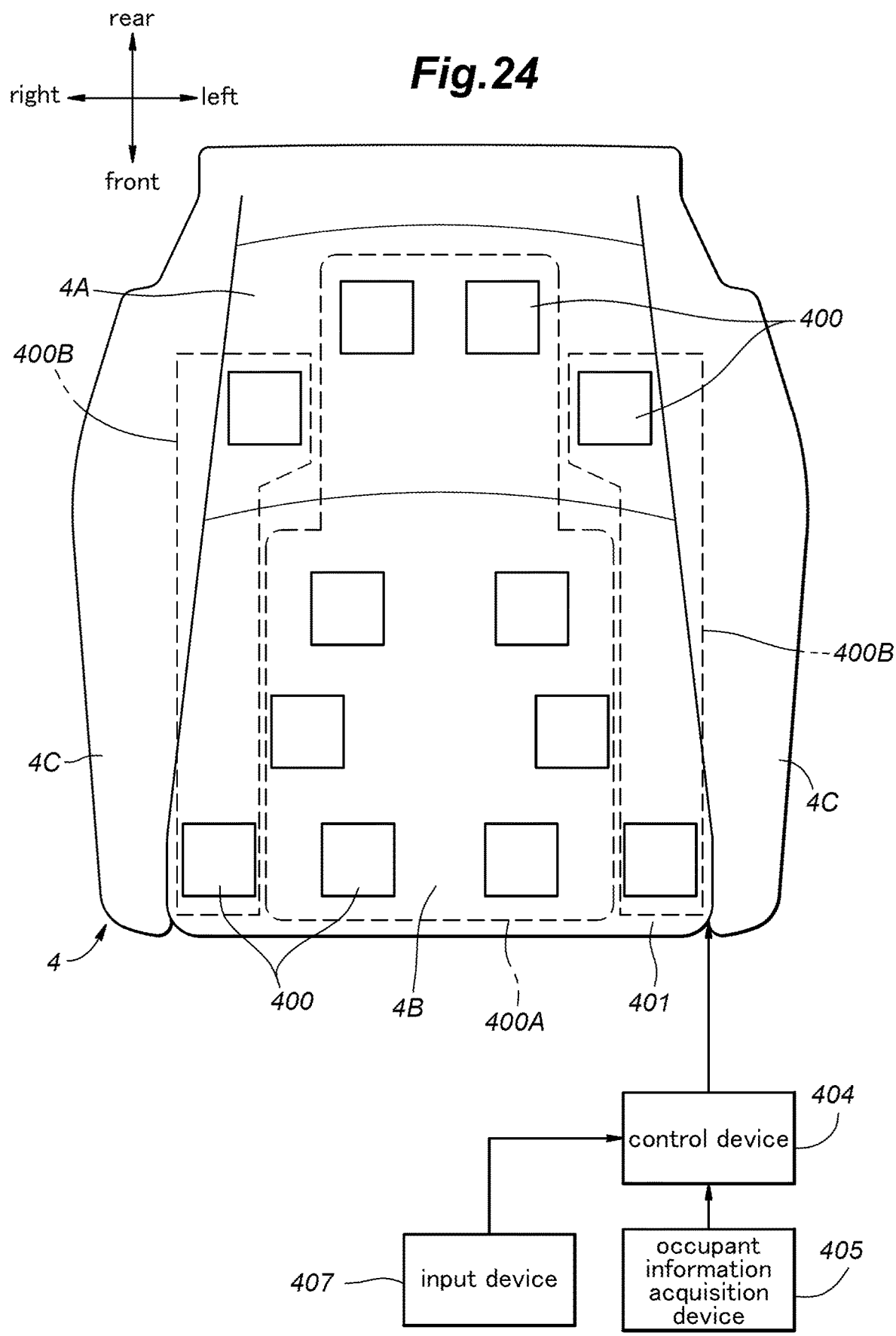
FIG. 24 is an explanatory diagram showing an arrangement of vibrators on the seat cushion.

As shown in FIG. 24, the seat cushion 4 may be provided with multiple vibrators 400. Each vibrator 400 preferably includes an electric motor and an eccentric weight joined to the drive shaft of the electric motor. The vibrator 400 generates vibration when the electric motor rotates.

Preferably, the multiple vibrators 400 are provided on an occupant-side surface (upper surface) of a pad 401 of the seat cushion 4, namely, between the pad 401 and the skin member 13. The multiple vibrators 400 include a first group 400A disposed in the center part of the seat cushion 4 in the left-right direction (width direction) and a second group 400B disposed on the left and right end portions of the seat cushion 4 in the left-right direction.

The seat cushion 4 includes a flat part 4B disposed in a central part in the left-right direction, and left and right elevated parts 4C disposed on left and right outer sides of the flat part 4B. The flat part 4B is formed to have a flat surface facing upward. In the present embodiment, the left and right elevated parts 4C protrude upward relative to the flat part 4B. The multiple vibrators 400 included in the first group 400A are arranged in the central part of the flat part 4B with respect to the left-right direction, and the multiple vibrators 400 included in the second group 400B are arranged in the left and right end portions of the flat part 4B with respect to the left-right direction. In another embodiment, the multiple vibrators 400 included in the first group 400A may be arranged in the flat part 4B, and the multiple vibrators 400 included in the second group 400B may be arranged in the left and right elevated parts 4C.

The multiple vibrators 400 are connected to a control device 404. The control device 404 causes at least one vibrator 400 selected from the multiple vibrators 400 to vibrate when a predetermined notification condition is satisfied.

Figure 25:
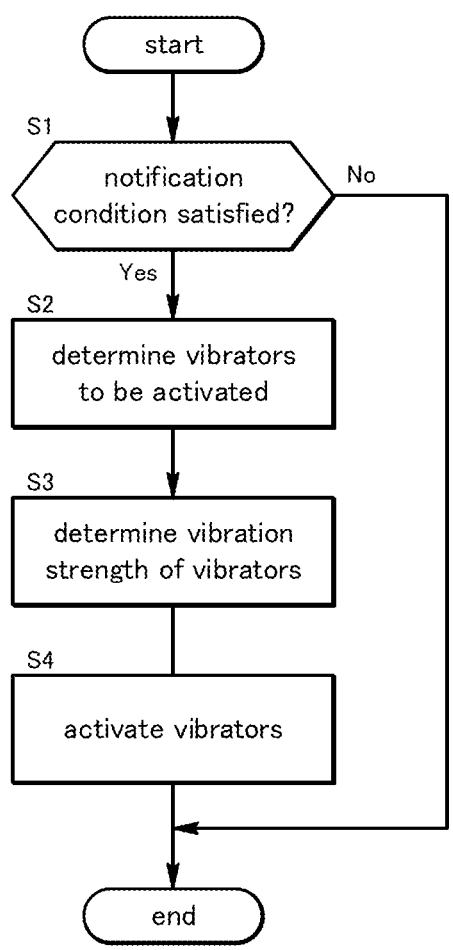
FIG. 25 is a flowchart showing a control procedure of the vibrators.

The control device 404 preferably controls the multiple vibrators 400 according to the procedure shown in FIG. 25, for example. First, the control device 404 determines whether the notification condition is satisfied (S1). The notification condition may be set arbitrarily and preferably includes, for example, whether the lateral acceleration of the vehicle in which the seat 1 is provided is greater than or equal to a predetermined value, when the forward-backward acceleration of the vehicle in which the seat 1 is provided is greater than or equal to a predetermined value, whether the automatic driving of the vehicle in which the seat 1 is provided will be ended, whether there is an obstacle within a predetermined range from the vehicle in which the seat 1 is provided, and the like.

The control device 404 then selects the vibrators 400 to be activated from among the multiple vibrators 400 (S2). Preferably, the control device 404 selects the vibrators 400 to be activated from among the multiple vibrators 400 based on a signal from an occupant information acquisition device 405. The occupant information acquisition device 405 preferably includes at least one of a camera capturing an image of the occupant seated on the seat 1 and a load sensor provided on the seat cushion 4 or the seatback 3. The control device 404 preferably determines the size of the occupant based on the image of the occupant captured by the camera serving as the occupant information acquisition device 405. Also, the control device 404 preferably determines the size of the occupant based on the load detected by the load sensor serving as the occupant information acquisition device 405. Then, the control device 404 preferably selects the vibrators 400 to be activated based on the size of the occupant. Preferably, the larger the size of the occupant is, the more the control device 404 increases the number of vibrators 400 to be activated. For example, preferably, the control device 404 activates the all vibrators 400 included in the first group 400A and the second group 400B when the size of the occupant is greater than or equal to a predetermined value, and activates only the vibrators 400 included in the first group 400A when the size of the occupant is less than the predetermined value.

Also, the control device 404 may be connected to an input device 407 for receiving input operation of the user and may select the vibrators 400 to be activated based on selection information inputted to the input device 407. The input device 407 is preferably a touch panel display provided in the vehicle, for example.

The control device 404 then determines vibration strength of the selected vibrators 400 (S3). The vibration strength of each vibrator 400 changes according to increase and decrease of the rotation speed of the electric motor included in the vibrator 400. Preferably, the control device 404 estimates the thickness of the clothes of the user based on the season or the image of the user captured by the camera, for example, and the greater the thickness of the clothes is, the more the control device 404 increases the vibration strength of the vibrators 400. For example, the thickness of the clothes may be classified into three levels: thin, middle, and thick, and the vibration strength of the vibrators 400 is varied according to the level of the thickness of the clothes. Preferably, the control device 404 acquires the date, and when the date is in summer, the control device 404 determines that the thickness of the clothes is thin, when the date is in spring or fall, the control device 404 determines that the thickness of the clothes is middle, and when the date is in winter, the control device 404 determines that the thickness of the clothes is thick.

Subsequently, the control device 404 causes the vibrators 400 selected in step S2 to vibrate with the vibration strength selected in step S3 (S4). Thereby, the vibrators 400 disposed in the area corresponding to the user seated on the seat 1 are activated. At this time, the vibrators 400 disposed in an area not corresponding to the user are not activated, and thus, an amount of electric power used can be reduced. Also, since the vibration strength of the vibrators 400 is increased/decreased according to the thickness of the clothes of the user, the vibrators 400 can reliably perform notification to the user regardless of the thickness of the clothes.

Figure 26:
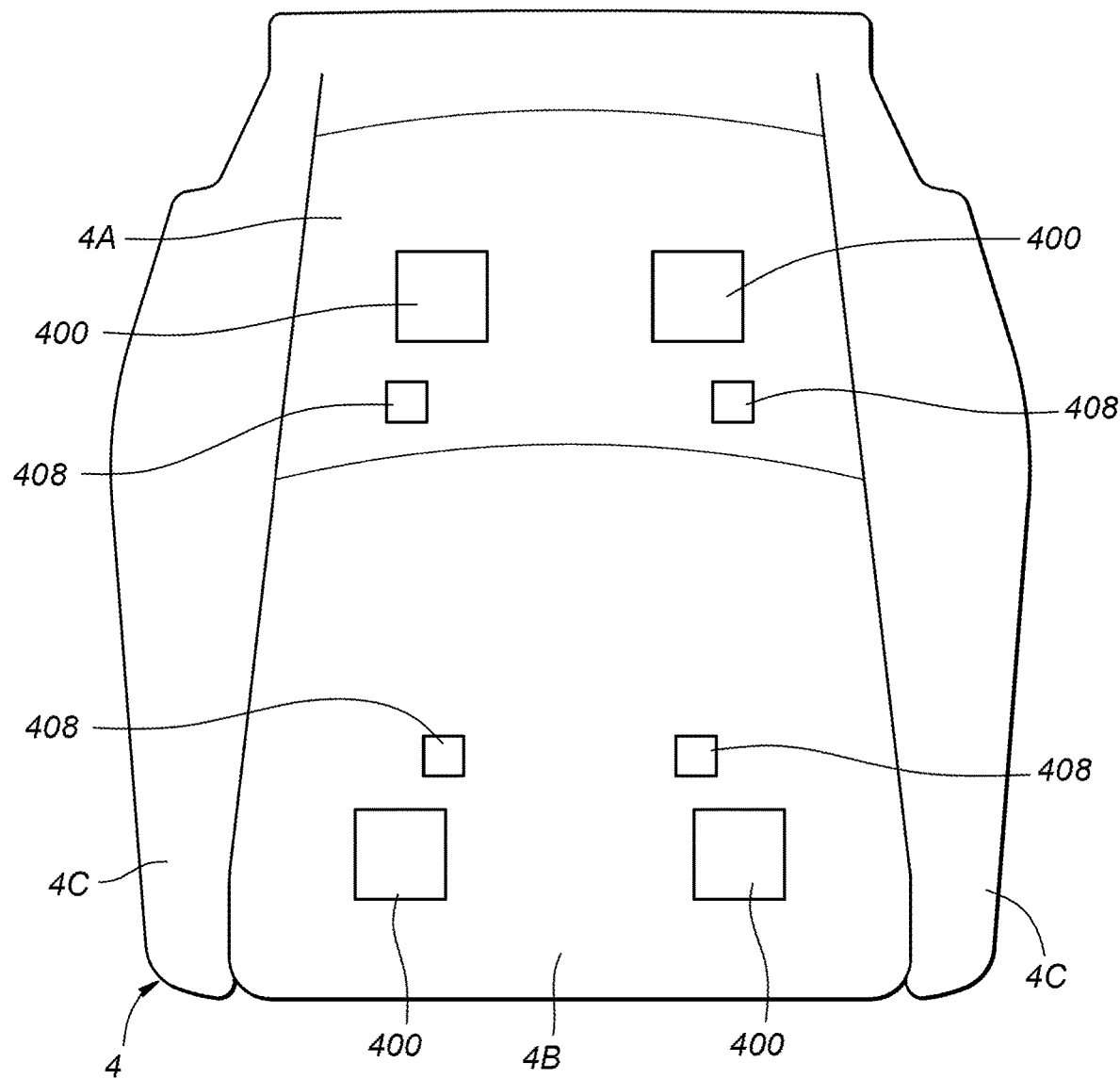
FIG. 26 is an explanatory diagram showing an arrangement of the vibrators on the seat cushion.

As shown in FIG. 26, multiple load sensors 408 may be dispersedly arranged on the upper surface 4A of the seat cushion 4. The control device 404 preferably acquires load distribution on the upper surface 4A of the seat cushion 4 based on the loads acquired by the multiple load sensors 408. Then, in step S2, the control device 404 preferably selects, as the vibrator(s) 400 to be activated, at least one vibrator 400 disposed in at least one region in which the load is greater than or equal to a predetermined value. Also, in step S3, the control device 404 may set the vibration strength of the vibrators 400 based on the load distribution. Preferably, the control device 404 sets the vibration strength of the vibrators 400 disposed in a region where the load is high to be greater than the vibration strength of the vibrators 400 disposed in a region where the load is low.

Similarly to the seat cushion 4, the vibrators 400 may be provided on the seatback 3, and each vibrator 400 on the seatback 3 may be controlled by the control device 404.

Figure 27:
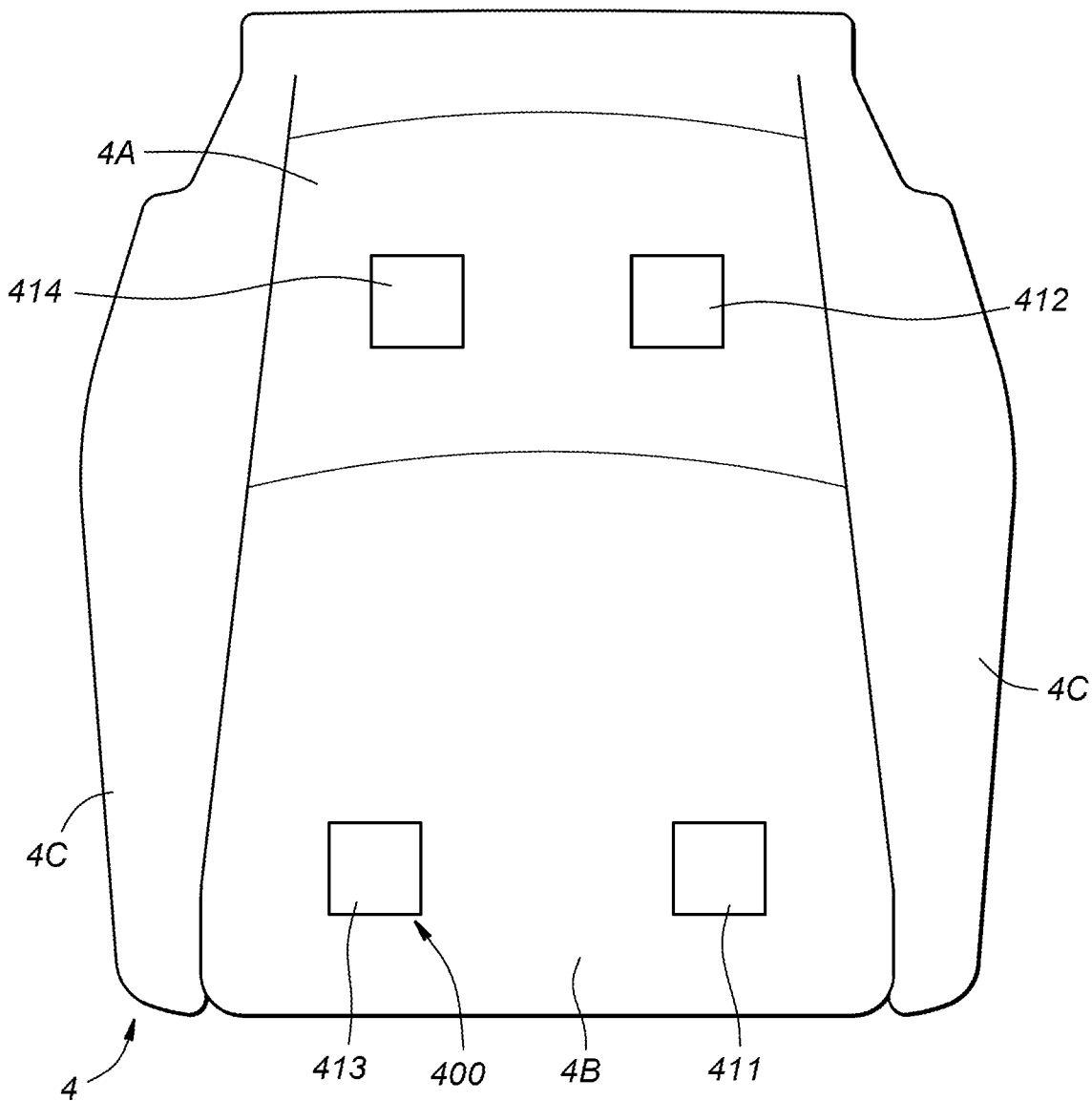
FIG. 27 is an explanatory diagram showing an arrangement of the vibrators on the seat cushion.

The seatback 3 and the seat cushion 4 may be provided with multiple vibrators 400 arranged in bilateral symmetry, and the vibrators 400 on only one of the left side and the right side may be activated. As shown in FIG. 27, first to fourth vibrators 411 to 414 are disposed on the seat cushion 4. The first vibrator 411 is disposed on a front left portion of the seat cushion 4, the second vibrator 412 is disposed on a rear left portion of the seat cushion 4, the third vibrator 413 is disposed on a front right portion of the seat cushion 4, and the fourth vibrator 414 is disposed on a rear right portion of the seat cushion 4. The first vibrator 411 and the third vibrator 413 are disposed in bilaterally symmetrical positions, and the second vibrator 412 and the fourth vibrator 414 are disposed in bilaterally symmetrical positions.

The control device 404 activates the first vibrator 411 and the second vibrator 412 when generating a left-side alert request, and activates the third vibrator 413 and the fourth vibrator 414 when generating a right-side alert request. For example, the control device 404 preferably generates the left-side alert request when it is determined, based on a signal from a lateral acceleration sensor, that the vehicle is turning left. Also, the control device 404 preferably generates the right-side alert request when it is determined, based on the signal from the acceleration sensor, that the vehicle is turning right. In another embodiment, the vibrators 400 may include only a pair of left and right vibrators 400.

Figure 28:
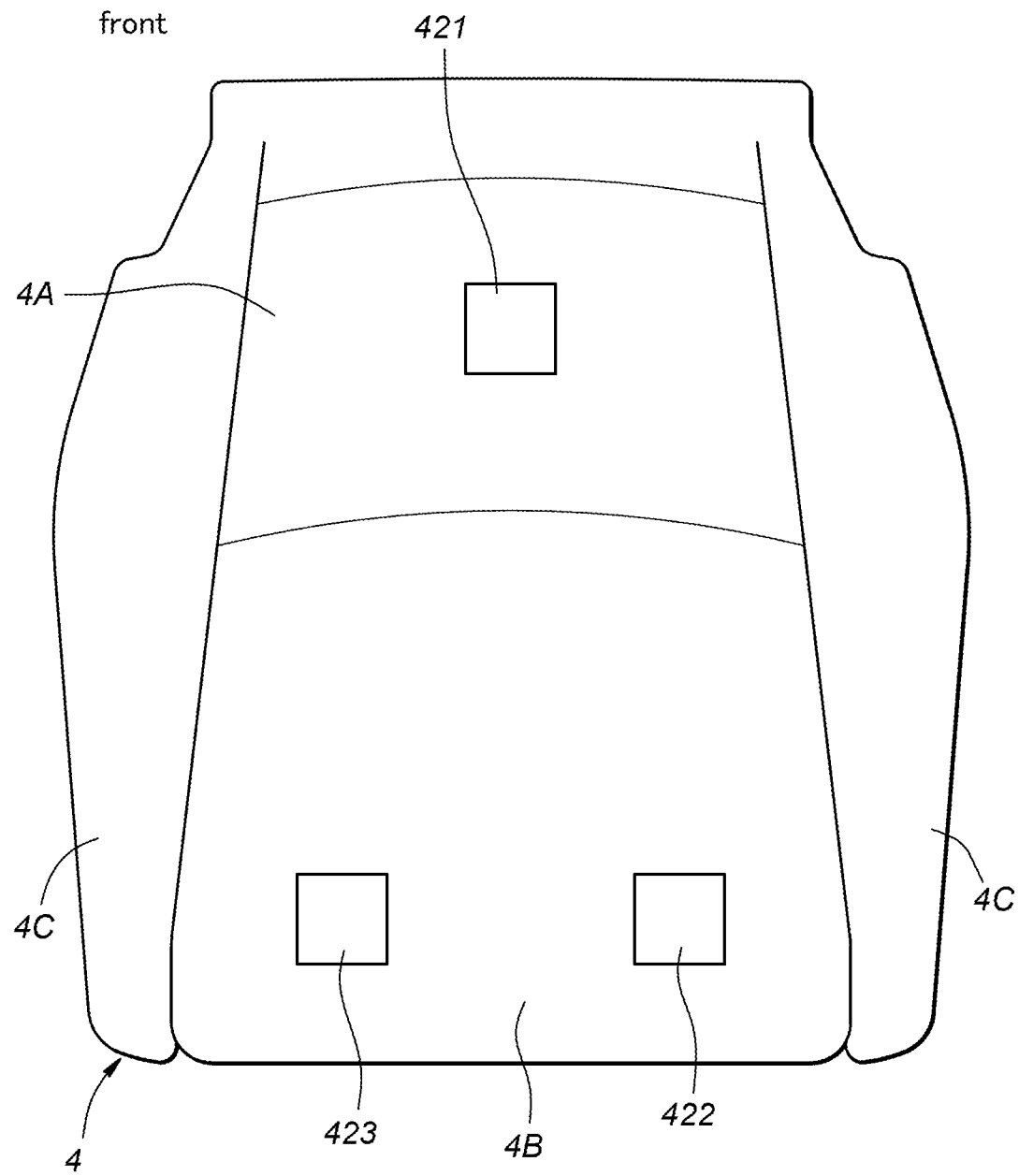
FIG. 28 is an explanatory diagram showing an arrangement of the vibrators on the seat cushion.

As shown in FIG. 28, the upper surface 4A of the seat cushion 4 may be provided only first to third vibrators 421, 422, 423. The first vibrator 421 is disposed on a rear portion of the seat cushion 4 centrally in the left-right direction. The second vibrator 422 is disposed on a front left portion of the seat cushion 4. The third vibrator 423 is disposed on a front right portion of the seat cushion 4. The first vibrator 421 is disposed in a position corresponding to the buttocks of the user, the second vibrator 422 is disposed in a position corresponding to the left thigh of the user, and the third vibrator 423 is disposed in a position corresponding to the right thigh of the user.

When generating the left-side alert request, the control device 404 preferably activates the first vibrator 421 and activates the second vibrator 422 after a predetermined delay time. Also, when generating the right-side alert request, the control device 404 activates the first vibrator 421 and activates the third vibrator 423 after a predetermined delay time.

Figure 29:
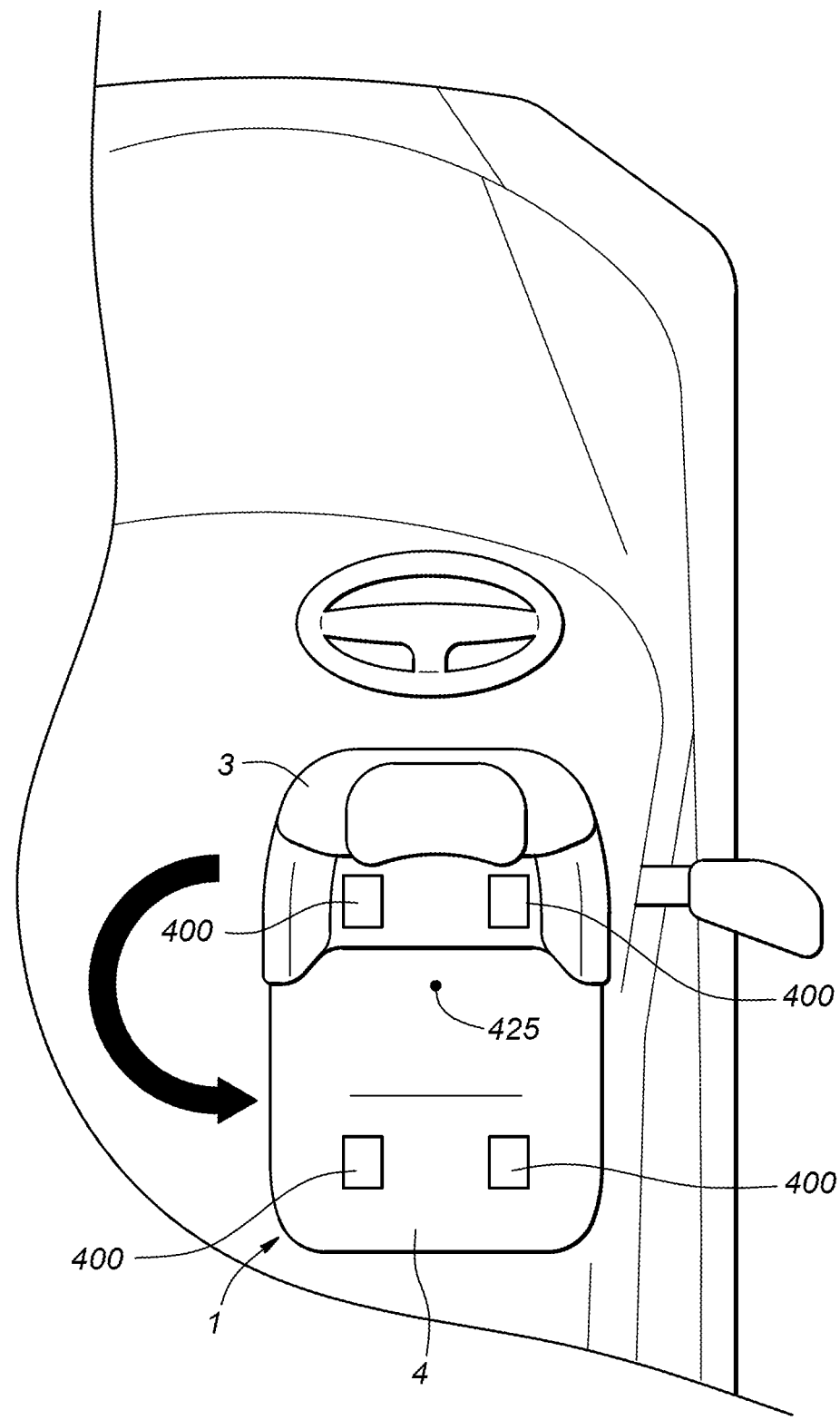
FIG. 29 is an explanatory diagram showing a rotation state of the seat.
Figure 30:
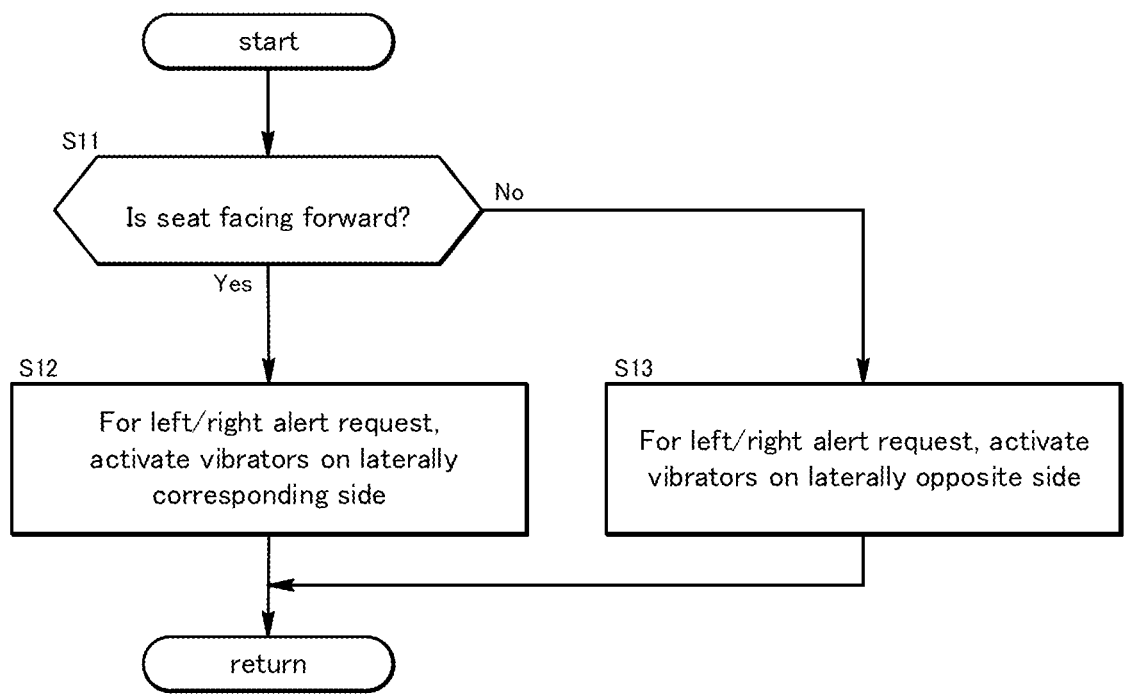
FIG. 30 is a flowchart showing a control procedure of the vibrators.

As shown in FIG. 29, in a case where the seat 1 is provided to be rotatable about a rotation axis 425 that extends vertically, the vibrator(s) 400 to be activated may be changed according to the rotation position of the seat 1. The seat 1 rotates about the rotation axis and can assume a forward-facing position in which the seat 1 faces forward and a rearward-facing position in which the seat 1 faces rearward. As shown in FIG. 30, the control device 404 preferably determines whether the seat 1 is in the forward-facing position (S11). When the seat 1 is in the forward-facing position (the determination result in S11 is Yes), the control device 404 activates the first vibrator 411 and the second vibrator 412, which are disposed on the left part of the seat cushion 4, for the left-side alert request, and activates the third vibrator 413 and the fourth vibrator 414, which are disposed on the right part of the seat cushion 4, for the right-side alert request (S12). When the seat 1 is not in the forward-facing position (the determination result in S11 is No), the control device 404 activates the third vibrator 413 and the fourth vibrator 414, which are disposed on the right part of the seat cushion 4, for the left-side alert request, and activates the first vibrator 411 and the second vibrator 412, which are disposed on the left part of the seat cushion 4, for the right-side alert request (S12).

Instead of the vibrators 400, devices for generating sound, scent, light, etc. may be provided. A device that transmits information to the user of the seat 1 by generating at least one of vibration, sound, scent, and light is defined as an information transmission device.

Figure 31:
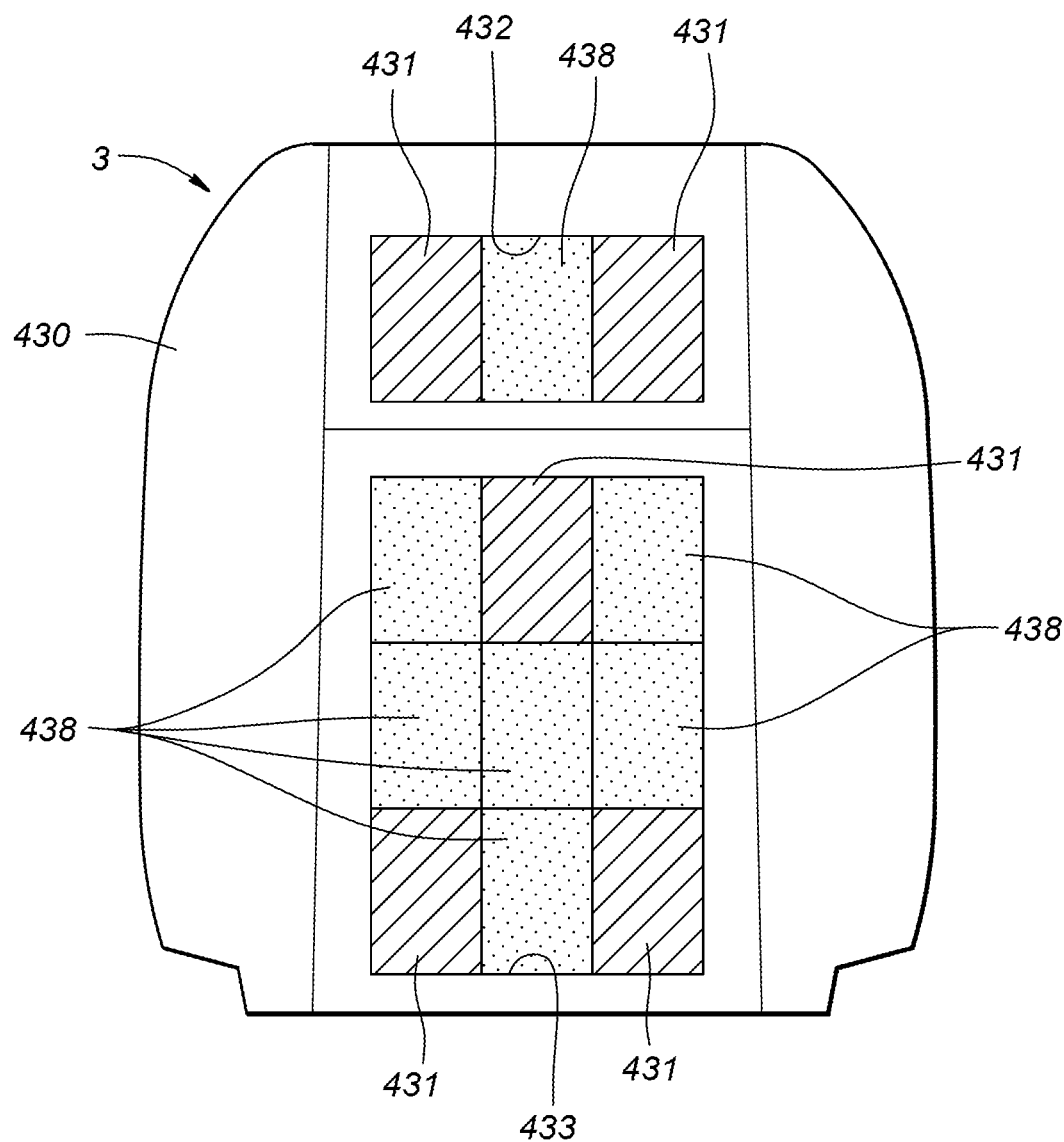
FIG. 31 is an explanatory diagram showing an arrangement example of devices on the seatback.

As shown in FIG. 31, the front surface of the pad 430 of the seatback 3 which faces the occupant is formed with a first reception hole 432 and a second reception hole 433 for receiving various devices 431. The first reception hole 432 and the second reception hole 433 are bottomed holes that open forward. The first reception hole 432 is formed in an upper portion of the pad 430, and the second reception hole 433 is formed in a lower portion of the pad 430. In the present embodiment, the first reception hole 432 and the second reception hole 433 are each formed in a rectangular shape as seen from front.

Figure 32:
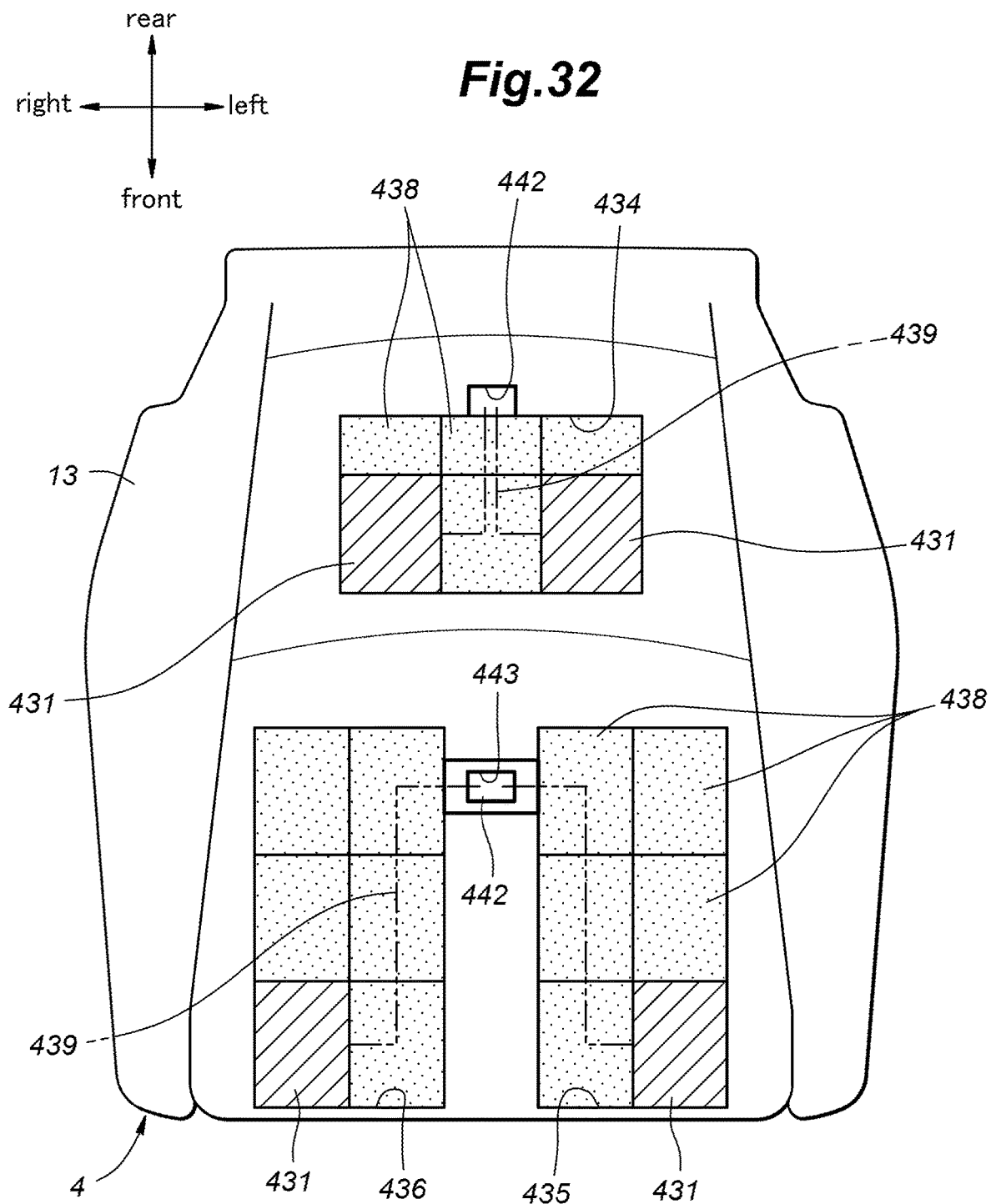
FIG. 32 is an explanatory diagram showing an arrangement example of devices on the seat cushion.

As shown in FIG. 32, the upper surface of the pad 401 of the seat cushion 4 which faces the occupant is formed with a third reception hole 434, a fourth reception hole 435, and a fifth reception hole 436 for receiving various devices 431. The third reception hole 434, the fourth reception hole 435, and the fifth reception hole 436 are bottomed holes that open upward. The third reception hole 434 is formed at a center in the left-right direction of a rear portion of the pad 401, the fourth reception hole 435 is formed in a front left portion of the pad 401, and the fifth reception hole 436 is formed in a front right portion of the pad 401. In the present embodiment, the third reception hole 434, the fourth reception hole 435, and the fifth reception hole 436 are each formed in a rectangular shape as seen from above.

Each device 431 includes a case forming an outer shape and electric equipment received in the case. The case of each device 431 is preferably formed in the same shape. In the present embodiment, the case of each device 431 is formed in a rectangular cuboid of the same size. The device 431 constitutes at least one of a vibrator, a sensor, and a temperature controlling device. The sensor preferably includes at least one of a load sensor, a heart rate sensor, a temperature sensor, a humidity sensor, and an acceleration sensor, for example. The temperature controlling device preferably includes at least one of an electric heating device, a cooling device including a Peltier element, and a fan.

Each device 431 may have multiple functions. The device 431 may be a combination of at least two of a vibrator, a sensor, and a temperature controlling device. The device 431 may include a vibrator and a sensor disposed on an outer surface of the vibrator.

Each of the first to fifth reception holes 432 to 436 is formed to have a size capable of receiving at least one device 431. Also, spacers 438 for filling gaps in the first to fifth reception holes 432 to 436 are disposed in each of the first to fifth reception holes 432 to 436. The spacers 438 are preferably made of the same material as the pads 401, 430.

The size of each of the first to fifth reception holes 432 to 436 is preferably an integer multiple of the size of a single device 431. Also, the spacer 438 is preferably formed in the same shape as the case of device 431. Thereby, each of the first to fifth reception holes 432 to 436 is filled, with an appropriate number of devices 431 and spacers 438 inserted in each of the first to fifth reception holes 432 to 436. As shown in FIG. 31, the first reception hole 432 is formed to have a size three times as large as that of the device 431 and receives two devices 431 and one spacer 438. The two devices 431 may have the same function or may have different functions. As shown in FIG. 32, the third reception hole 434 is not formed to have a size that is an integer multiple of the size of the device 431. Therefore, two or more kinds of spacers 438 having different shapes are used to fill the gap between the third reception hole 434 and the two devices 431.

Figure 33:
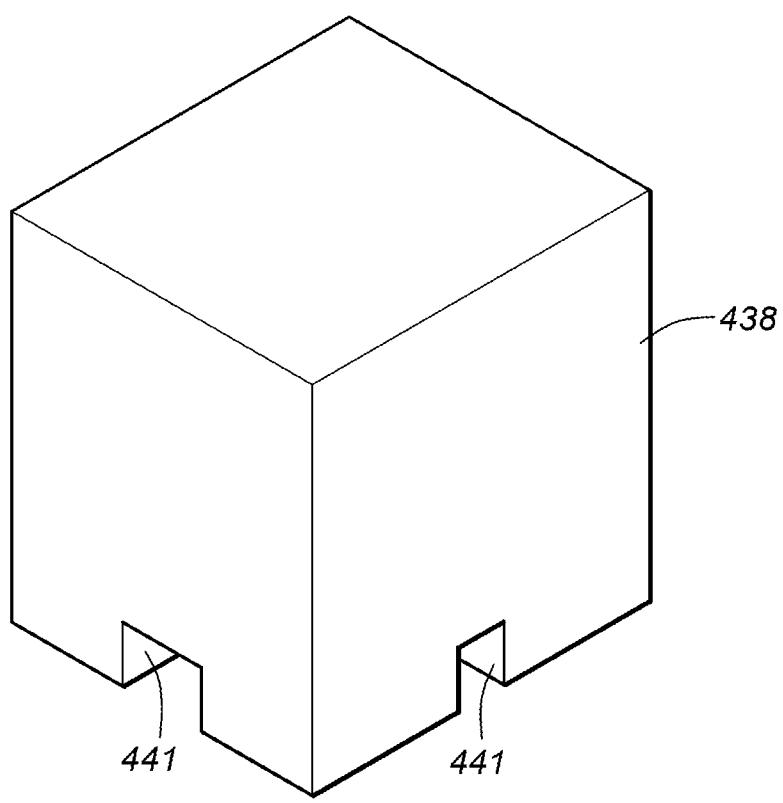
FIG. 33 is a perspective view of a spacer.
Figure 34:
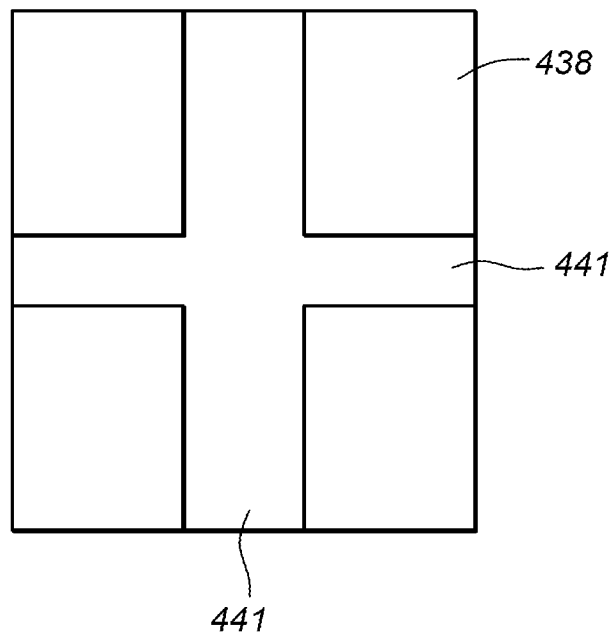
FIG. 34 is a bottom view of the spacer.
Figure 35:
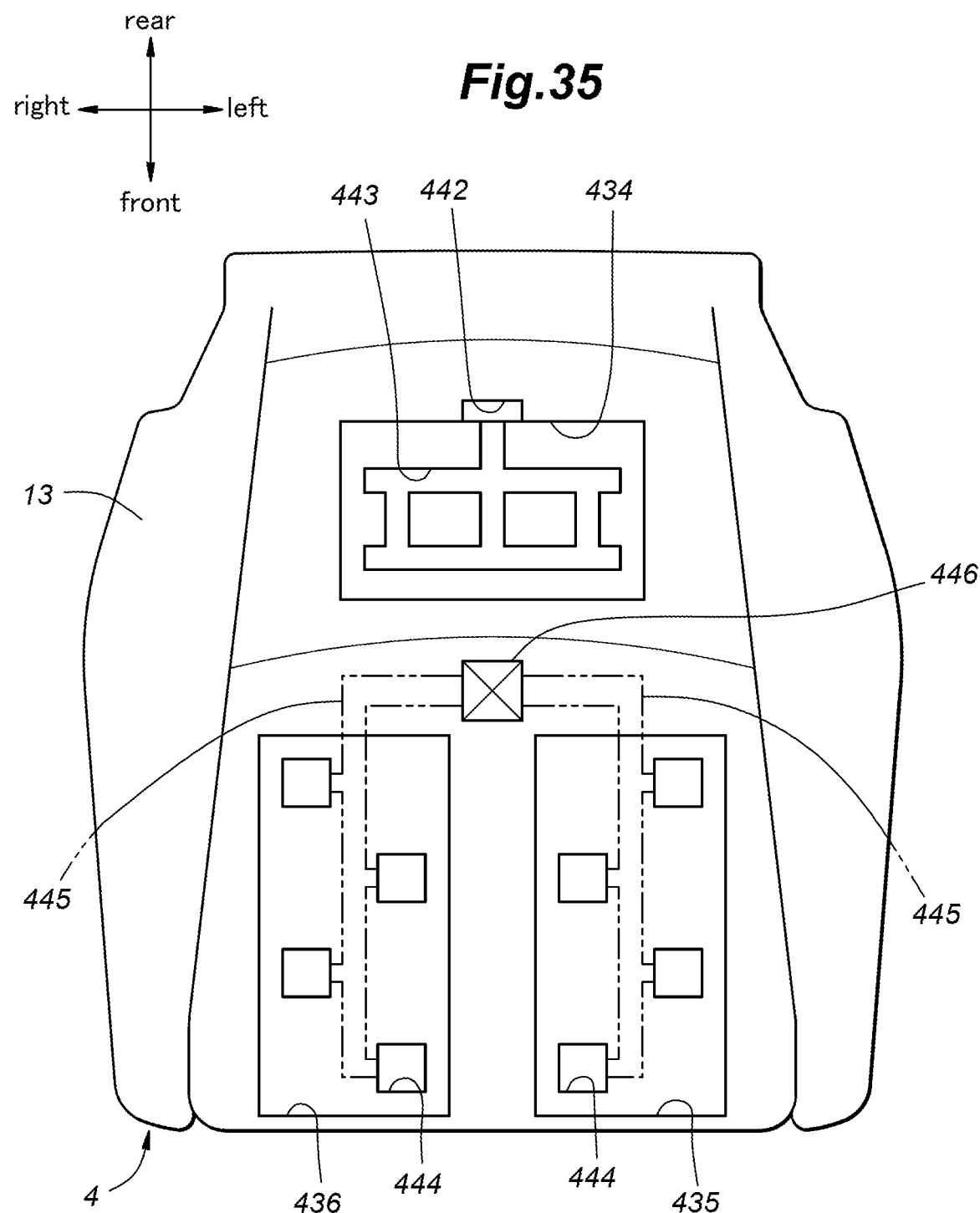
FIG. 35 is an explanatory diagram of a pad of the seat cushion.

As shown in FIGS. 33 and 34, the spacer 438 has a harness groove 441 for receiving a wire harness 439 extending from the device 431. The harness groove 441 is preferably formed in the bottom surface of the spacer 438, namely, in the surface for contacting the bottom surfaces of the first to fifth reception holes 432 to 436. The spacer 438 may be provided with multiple harness grooves 441, which may include two harness grooves that intersect each other, for example. As shown in FIG. 35, in another embodiment, a harness groove 443 may be formed in the bottom portion of the third reception hole 434. As shown in FIGS. 32 and 35, the pads 401, 430 are formed with harness holes 442 adjacent to the first to fifth reception holes 432 to 436. The harness holes 442 penetrate the pads 401, 430 in the thickness direction. The wire harnesses 439 pass through the harness holes 442 and extend to the reverse side of the pads 401, 430. A harness holes 442 is provided adjacent to the third reception hole 434. Also, a connection groove 447 that connects the fourth reception hole 435 and the fifth reception hole 436 may be formed, and a harness hole 442 may be formed in a bottom portion of the connection groove 447.

As shown in FIG. 35, the bottom portion of each of the first to fifth reception holes 432 to 436 may be formed with multiple vent holes 444. The multiple vent holes 444 may penetrate the pads 401, 430 in the thickness direction. Also, the multiple vent holes 444 may communicate with air passaged 445 formed in the pads 401, 430. Preferably, a blower 446 is provided in the air passages 445. The spacers 438 disposed in positions corresponding to the vent holes 444 preferably have air permeability. The spacers 438 preferably have at least one through hole penetrating in the thickness direction, for example. Also, the spacers 438 are preferably formed of porous bodies having air permeability. When multiple vent holes 444 are provided, it is preferred that each device 431 is disposed in a position avoiding the vent holes 444.

Figure 36:
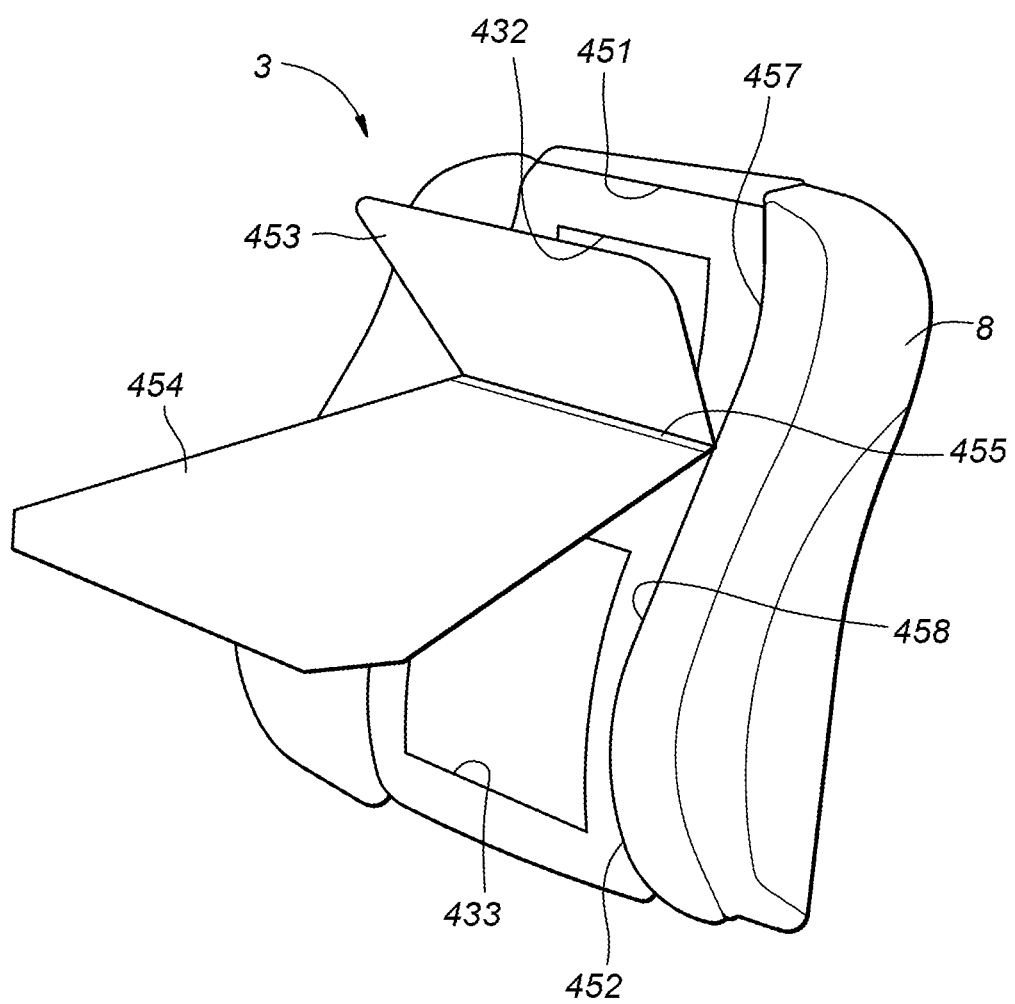
FIG. 36 is a perspective view of the seatback.

As shown in FIG. 36, the skin member 8 of the seatback 3 is formed with a first opening 451 for exposing the first reception hole 432 to outside and a second opening 452 for exposing the second reception hole 433 to outside. The first opening 451 is covered by a first cover 453 detachably joined to the skin member 8. The second opening 452 is covered by a second cover 454 detachably joined to the skin member 8. Each of the first cover 453 and the second cover 454 may be inseparably joined to the skin member 8 at a part thereof. In the present embodiment, the skin member 8 has a cover fixing part 455 disposed between the first opening 451 and the second opening 452 and extending laterally. The lower edge of the first cover 453 and the upper edge of the second cover 454 are joined to the cover fixing part 455. The left and right side edges and the lower edge of the first cover 453 are detachably attached to the edge part of the first opening 451 by means of a fastener 457. Similarly, the left and right side edges and the lower edge of the second cover 454 are detachably attached to the edge part of the second opening 452 by means of a fastener 458.

Figure 37:
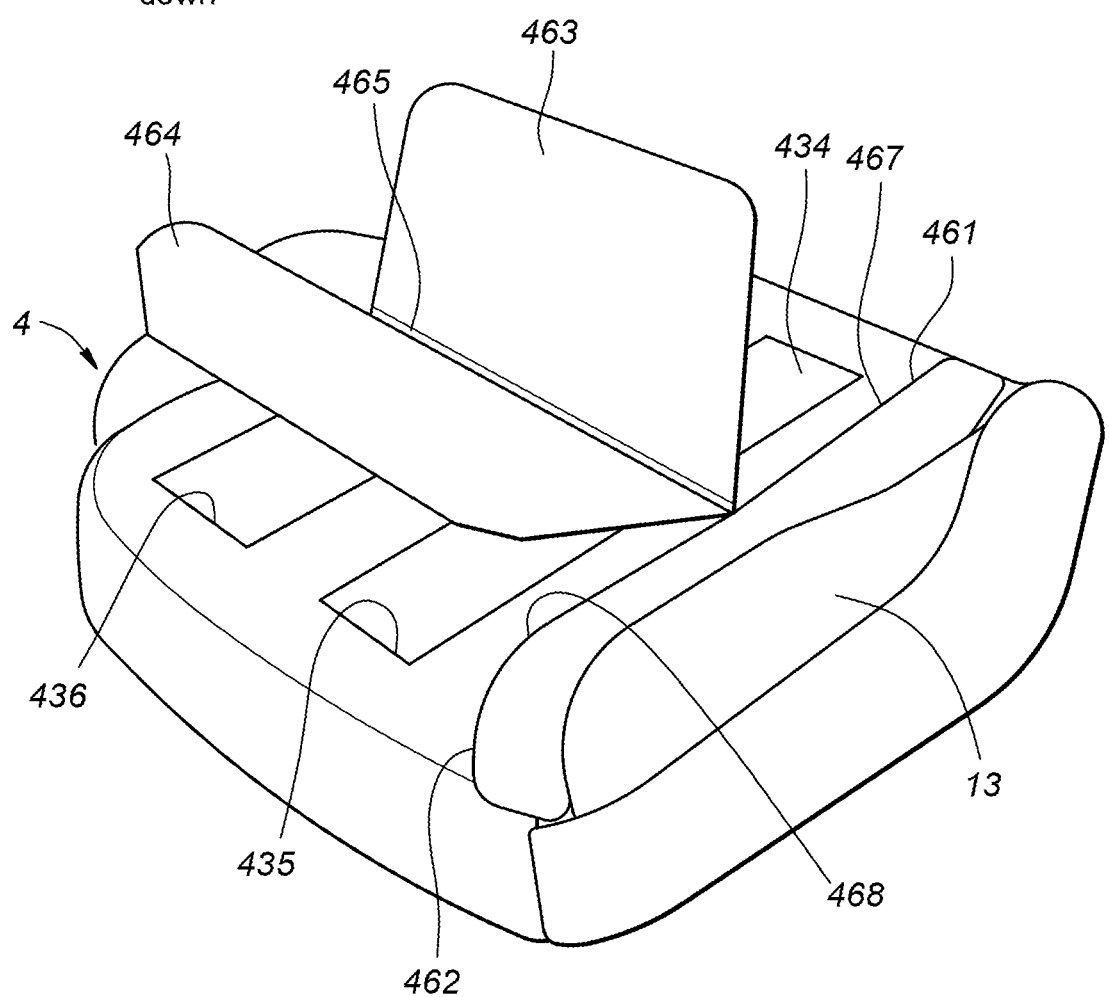
FIG. 37 is a perspective view of the seat cushion.

As shown in FIG. 37, the skin member 13 of the seat cushion 4 is formed with a third opening 461 for exposing the third reception hole 434 to outside and a fourth opening 462 for exposing the fourth reception hole 435 and the fifth reception hole 436 to outside. The third opening 461 is covered by a third cover 463 detachably joined to the skin member 13. The fourth opening 462 is covered by a fourth cover 464 detachably joined to the skin member 13. Each of the third cover 463 and the fourth cover 464 may be inseparably joined to the skin member 13 at a part thereof. In the present embodiment, the skin member 13 has a cover fixing part 465 disposed between the third opening 461 and the fourth opening 462 and extending laterally. The front edge of the third cover 463 and the rear edge of the fourth cover 464 are joined to the cover fixing part 465. The left and right side edges and the rear edge of the third cover 463 are detachably attached to the edge part of the third opening 461 by means of a fastener 467. Similarly, the left and right side edge and the front edge of the fourth cover 464 are detachably attached to the edge part of the fourth opening 462 by means of a fastener 468.

According to these aspects, the first to fifth reception holes 432 to 436 can be exposed by opening the first to fourth covers 453, 454, 463, 464. Therefore, replacement and position change of the devices 431 are easy. In another embodiment, instead of the fasteners 458, 468, other detachable joint members, such as a snap button, may be used.

LIST OF REFERENCE NUMERALS

1: seat
2: floor
3: seatback
4: seat cushion
6: seatback frame
11: seat cushion frame
15: slide device
35: link
40: ottoman
54: headrest
61: armrest
71: protective cover
73: accommodation space
81: left seat
82: right seat
84: gap
85: cover member
91: baggage accommodation space
93: first movable member
94: second movable member
96: first coupling member
97: second coupling member
101: box body
102: support plate

The invention claimed is:

1. A vehicle seat comprising a seat cushion and a seatback and configured to assume a use state in which a user can be seated thereon and a stowed state in which the seatback has pivoted forward from the use state to overlap with the seat cushion,
   wherein the vehicle seat comprises an article placement part which, in the stowed state, protrudes more forward than the seatback and is provided with a support surface that faces upward,
   wherein the article placement part is an ottoman supported by the seat cushion, and
   wherein, in the stowed state, the ottoman is configured to pivot to a horizontal position which extends forward from a front end of the seat cushion,
   an upward facing surface of the ottoman in the horizontal position forms the support surface, and
   when the ottoman is in the horizontal position, in the stowed state, the support surface is disposed at a same height as a front end of an upper surface of the seat cushion.

2. The vehicle seat according to claim 1, wherein the ottoman is pivotable relative to the seat cushion.

3. The vehicle seat according to claim 2, wherein in the stowed state, the ottoman is pivotable relative to the seat cushion.

4. The vehicle seat according to claim 1, wherein in the stowed state, the seatback extends more forward than the seat cushion.

5. The vehicle seat according to claim 4, wherein in the stowed state, a front end of the ottoman contacts a rear surface of another seat disposed in front thereof.

6. The vehicle seat according to claim 1, further comprising a flexible protective cover having a base end joined to a rear surface of the seatback and a free end,
wherein when the vehicle seat is in the stowed state, the protective cover is folded back forward and covers the support surface of the ottoman.

7. The vehicle seat according to any one of claim 1, wherein two said vehicle seats are arranged side by side on left and right, and
a gap is formed between the left and right ottomans.

8. The vehicle seat according to claim 7, wherein the left and right seat cushions contact each other in a left-right direction, and
the left and right seatbacks contact each other in the left-right direction.

9. A method for manufacturing a vehicle seat, the vehicle seat comprising a seat cushion and a seatback and configured to assume a use state in which a user can be seated thereon and a stowed state in which the seatback has pivoted forward from the use state to overlap with the seat cushion,
the method comprising providing the vehicle seat with an article placement part which, in the stowed state, protrudes more forward than the seatback and is provided with a support surface that faces upward,
wherein the article placement part is an ottoman supported by the seat cushion, and
wherein, in the stowed state, the ottoman is configured to pivot to a horizontal position which extends forward from a front end of the seat cushion,
an upward facing surface of the ottoman in the horizontal position forms the support surface, and
when the ottoman is in the horizontal position, in the stowed state, the support surface is disposed at a same height as a front end of an upper surface of the seat cushion.

10. The method for manufacturing the vehicle seat according to claim 9, wherein the ottoman is pivotable relative to the seat cushion.

11. The method for manufacturing the vehicle seat according to claim 10, wherein in the stowed state, the ottoman is pivotable relative to the seat cushion.

12. The method for manufacturing the vehicle seat according to claim 9, wherein in the stowed state, the seatback extends more forward than the seat cushion.

13. The method for manufacturing the vehicle seat according to claim 12, wherein in the stowed state, a front end of the ottoman contacts a rear surface of another seat disposed in front thereof.

14. The method for manufacturing the vehicle seat according to claim 9, further comprising providing the vehicle seat with a flexible protective cover having a base end joined to a rear surface of the seatback and a free end,
wherein when the vehicle seat is in the stowed state, the protective cover is folded back forward and covers the support surface of the ottoman.

15. The method for manufacturing the vehicle seat according to claim 9, wherein the method comprises arranging two said vehicle seats side by side on left and right such that a gap is formed between the left and right ottomans.

16. The method for manufacturing the vehicle seat according to claim 15, wherein the left and right seat cushions contact each other in a left-right direction, and the left and right seatbacks contact each other in the left-right direction.

* * * * *